(12) United States Patent
Degtiarev et al.

(10) Patent No.: US 12,307,563 B1
(45) Date of Patent: May 20, 2025

(54) TEXT-DRIVEN PHOTO STYLE ADJUSTMENT WITH GENERATIVE AI

(71) Applicant: Glam Labs, Inc., San Francisco, CA (US)

(72) Inventors: Roman Degtiarev, Tbilisi (GE); Tikhon Vorobev, Saint Petersburg (RU)

(73) Assignee: Glam Labs, Inc., San Francisco, CA (US)

( * ) Notice: Subject to any disclaimer, the term of this patent is extended or adjusted under 35 U.S.C. 154(b) by 0 days.

(21) Appl. No.: 19/038,376

(22) Filed: Jan. 27, 2025

Related U.S. Application Data

(63) Continuation-in-part of application No. 18/748,397, filed on Jun. 20, 2024, now Pat. No. 12,211,180.

(51) Int. Cl.
| | |
|---|---|
| *G06T 11/60* | (2006.01) |
| *G06T 5/70* | (2024.01) |
| *G06T 7/194* | (2017.01) |
| *G06T 7/70* | (2017.01) |
| *G06T 9/00* | (2006.01) |
| *G06V 10/25* | (2022.01) |
| *G06V 20/70* | (2022.01) |
| *G06V 40/16* | (2022.01) |

(52) U.S. Cl.
CPC ............. *G06T 11/60* (2013.01); *G06T 5/70* (2024.01); *G06T 7/194* (2017.01); *G06T 7/70* (2017.01); *G06T 9/00* (2013.01); *G06V 10/25* (2022.01); *G06V 20/70* (2022.01); *G06V 40/161* (2022.01); *G06V 40/178* (2022.01); *G06T 2207/20084* (2013.01)

(58) Field of Classification Search
CPC . G06T 11/60; G06T 5/70; G06T 7/194; G06T 7/70; G06T 9/00; G06T 2207/20084; G06V 10/25; G06V 20/70; G06V 40/161; G06V 40/178
See application file for complete search history.

(56) References Cited

U.S. PATENT DOCUMENTS

| | | | |
|---|---|---|---|
| 11,922,550 B1 * | 3/2024 | Ramesh ................ | G06F 40/284 |
| 2023/0154213 A1 * | 5/2023 | Gao ...................... | G06V 10/25 |
| | | | 382/159 |
| 2024/0087179 A1 * | 3/2024 | Min ....................... | G06T 11/00 |
| 2024/0203005 A1 * | 6/2024 | Palangi ................. | G06T 11/60 |

(Continued)

*Primary Examiner* — Jin Cheng Wang
(74) *Attorney, Agent, or Firm* — Georgiy L. Khayet

(57) ABSTRACT

Systems and methods for text-driven photo style adjustment with generative artificial intelligence are provided. An example method includes receiving an image and text, determining and filtering one or more face bounding boxes and one or more body bounding boxes to obtain and analyze a further face bounding box and a further human body bounding box, generating text description based on the analysis, combining the text description and the text to obtain updated text, encoding the image into an image latent, encoding the updated text into a text embedding, generating a first noise, adding the first noise to the image latent to obtain a noisy image latent, providing the noisy image latent and the text embedding to a first neural network to generate a second noise, removing the second noise from the noisy image latent to obtain a denoised image latent, and decoding the denoised image latent into a result image.

20 Claims, 14 Drawing Sheets

(56) References Cited

U.S. PATENT DOCUMENTS

| | | | | |
|---|---|---|---|---|
| 2024/0355017 A1* | 10/2024 | Elyahu Zada | .......... | G06T 11/60 |
| 2024/0419726 A1* | 12/2024 | Jenni | ...................... | G06F 16/535 |
| 2024/0419949 A1* | 12/2024 | Aykut | .................... | G06N 3/088 |
| 2024/0420389 A1* | 12/2024 | Batra | .................... | G06T 11/001 |
| 2025/0022099 A1* | 1/2025 | Song | ........................ | G06T 5/50 |
| 2025/0029289 A1* | 1/2025 | Bai | ........................ | G06T 11/00 |
| 2025/0078366 A1* | 3/2025 | Cho | ........................ | G06T 5/70 |

* cited by examiner

TEXT-DRIVEN PHOTO STYLE ADJUSTMENT WITH GENERATIVE AI

CROSS-REFERENCE TO RELATED APPLICATIONS

This application is a Continuation-in-Part of and claims the priority benefit of U.S. patent application Ser. No. 18/748,397, entitled "AI-DRIVEN PHOTO STYLIZATION WITH TEXT DESCRIPTION TUNING" and filed on Jun. 20, 2024. The subject matter of the aforementioned application is incorporated herein by reference in its entirety for all purposes.

TECHNICAL FIELD

This disclosure generally relates to image processing. More particularly, this disclosure relates to systems and methods for text-driven photo style adjustment with generative artificial intelligence (AI).

BACKGROUND

AI-based image generation and transformation is used in many applications, such as video chats, social networks, online media, and others. These technologies enable users to edit, stylize, and enhance images in ways that were previously impossible, thereby providing a highly customizable experience. However, conventional image transformation systems often struggle with accurately identifying and maintaining specific key elements within an image. This may result in the inability to reliably preserve the identity and intent of the original image. For example, conventional image transformation systems may misinterpret animals depicted in images, which may result in transforming the animals into human-like figures or otherwise altering their nature in unintended ways. Similarly, these conventional image transformation systems often fail to correctly interpret and preserve complex human poses, such as distinguishing between a person facing toward or away from the camera. Furthermore, the conventional image transformation systems may misrepresent characteristics of objects in the image, such as a gender or a race of a person. Accordingly, conventional image transformation models may be insufficient to ensure that transformations of images are both accurate and contextually appropriate.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to an example embodiment of the present disclosure, a method for text-driven photo style adjustment with generative AI is provided. The method may commence with receiving an image that includes at least one object and receiving a text that includes at least one instruction for transforming the image. The method may further include determining, based on the image, a foreground mask corresponding to the object. The method may proceed with determining, based on the image, one or more face bounding boxes corresponding to one or more faces present in the image. The method may further include determining, based on the image, one or more body bounding boxes corresponding to one or more human bodies present in the image. The one or more face bounding boxes are filtered using the foreground mask to retain only those bounding boxes that intersect the regions identified by the foreground mask, resulting in at least one refined face bounding box. The one or more body bounding boxes may be filtered using the foreground mask to obtain at least one further human body bounding box. The method may proceed with analyzing the at least one further face bounding box and the at least one further human body bounding box to generate a text description concerning at least one person present in the image. Detected attributes, including gender, pose, and other details, are integrated into the original text using predefined templates to create updated prompts (updated text) for precise transformations. The image may be encoded into an image latent and the updated text may be encoded into a text embedding. The method may further include randomly generating a first noise for a portion of the image latent and adding the first noise to the image latent to obtain a noisy image latent. The method may proceed with providing the noisy image latent and the text embedding to a first neural network to generate a second noise and removing the second noise from the noisy image latent to obtain a denoised image latent. The first noise includes Gaussian noise. Mask callbacks are used to guide the application of noise and denoising steps to specific regions. This iterative refinement ensures accurate alignment with prompts and style instructions. The method may further include decoding, using a second neural network, the denoised image latent into a result image.

According to another embodiment, a system for text-driven photo style adjustment with generative AI is provided. The system may include at least one processor and a memory storing processor-executable instructions, where the processor can be configured to implement the operations of the above-mentioned method for text-driven photo style adjustment with generative AI.

According to yet another aspect of the disclosure, there is provided a non-transitory computer-readable storage medium, which stores processor-readable instructions. When the computer-readable instructions are executed by a computing device, they cause the computing device to implement the above-mentioned method for text-driven photo style adjustment with generative AI.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
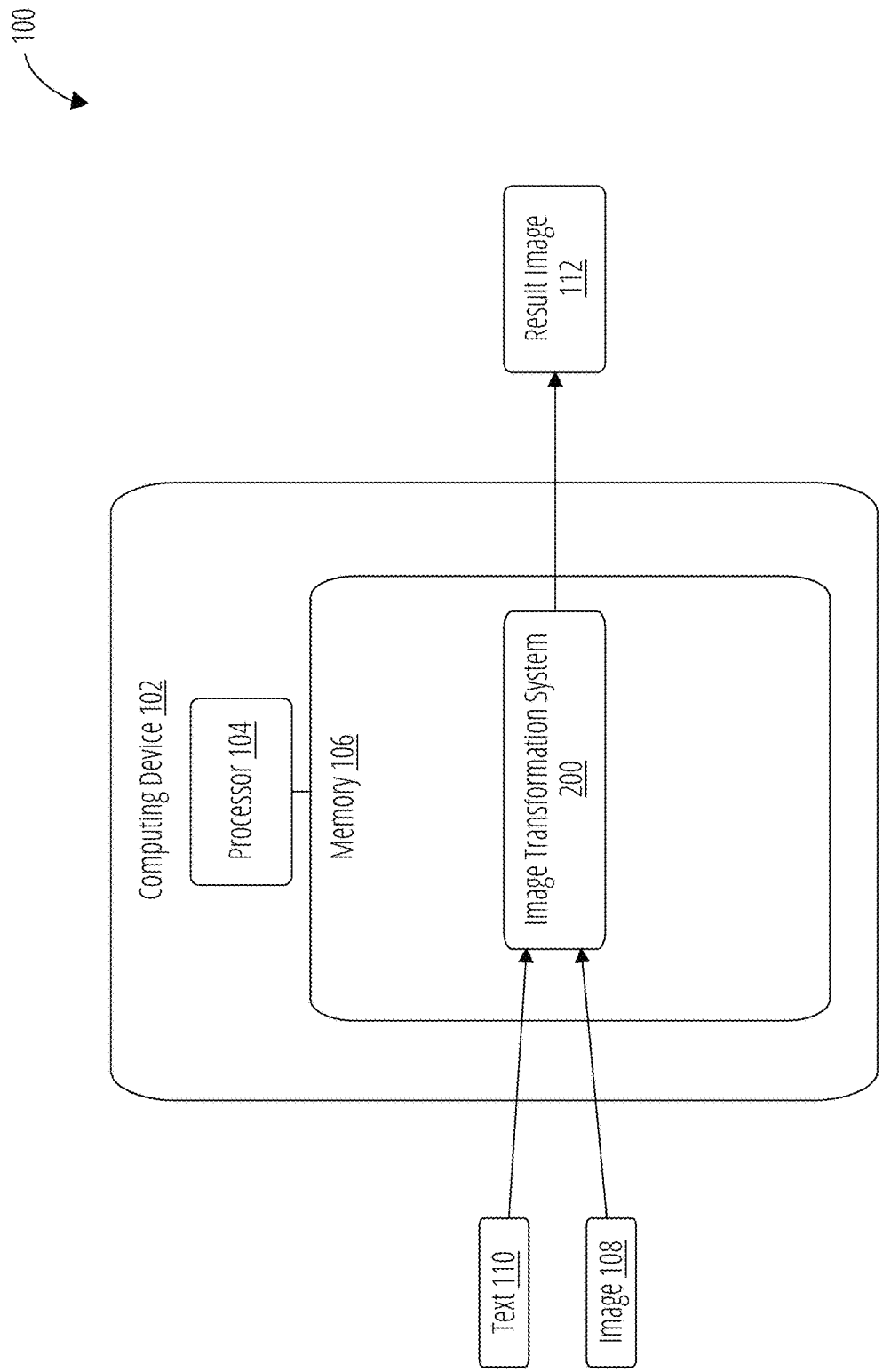
FIG. 1 shows an example environment, in which systems and methods for text-driven photo style adjustment with generative AI can be implemented, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The terms "can" and "may" shall mean "possibly be, but not limited to be."

This disclosure describes systems and methods for text-driven photo style adjustment with generative AI. The systems and methods include modifying the text description of an object present in an image to accurately preserve the identity of the generated image. Using this approach, the systems and methods can eliminate problem of changing the gender or race of humans in the image, turning animals into people, and so forth.

In an example embodiment, the method includes receiving an image that includes at least one object and receiving a text that includes at least one instruction for transforming the image. Based on the image, a foreground mask corresponding to the at least one object may be determined. Additionally, based on the image, one or more face bounding boxes corresponding to one or more faces present in the image, as well as one or more body bounding boxes corresponding to one or more human bodies present in the image may be determined. The one or more face bounding boxes may be filtered, using the foreground mask, to obtain at least one further face bounding box. The one or more body bounding boxes may be filtered, using the foreground mask, to obtain at least one further human body bounding box. The at least one further face bounding box and the at least one further human body bounding box may be analyzed to generate a text description concerning at least one person present in the image. The text description and the text may then be combined to obtain an updated text. The image may be encoded into an image latent and the updated text may be encoded into a text embedding. A first noise for a portion of the image latent may be randomly generated and the first noise may be added to the image latent to obtain a noisy image latent. The noisy image latent and the text embedding may be provided to a first neural network to generate a second noise. The second noise may be removed from the noisy image latent to obtain a denoised image latent. The noisy image latent may be decoded, using a second neural network, into a result image.

Accordingly, the systems and methods of the present disclosure provide text-driven image generation and style adjustment, while ensuring that transformations are both accurate and contextually appropriate, thereby improving user experience.

Referring now to the drawings, FIG. 1 shows an example environment 100, in which systems and methods for text-driven photo style adjustment with generative AI can be implemented. Environment 100 may include a computing device 102 that may include a processor 104 and a memory 106. Memory 106 may store, as processor-executable instructions, an image transformation system 200.

Computing device 102 may include, but is not limited to, a laptop computer or desktop computer including a graphic processing unit. In some embodiments, computing device 102 can be a part of cloud-based computing resource(s) shared by multiple users. The cloud-based computing resource(s) can include hardware and software available at a remote location and accessible over a data network. The cloud-based computing resource(s) can be dynamically re-allocated based on demand. The cloud-based computing resource(s) may include one or more server farms/clusters including a collection of computer servers that can be co-located with network switches and/or routers.

Image transformation system 200 can receive an image 108 and a text 110. The text 110 may include a prompt on how to stylize image 108. Image transformation system 200 can generate a result image 112 based on image 108 and text 110. In various embodiments, the prompts in text 110 may include, for example, "generate an image in anime style," "add snow to the background," "do not modify the background," and so forth. Image 108 and text 110 can be provided by a user of computing device 102 via a user interface. Details of image transformation system 200 are described with reference to FIG. 2A and FIG. 2B.

Figure 2A:
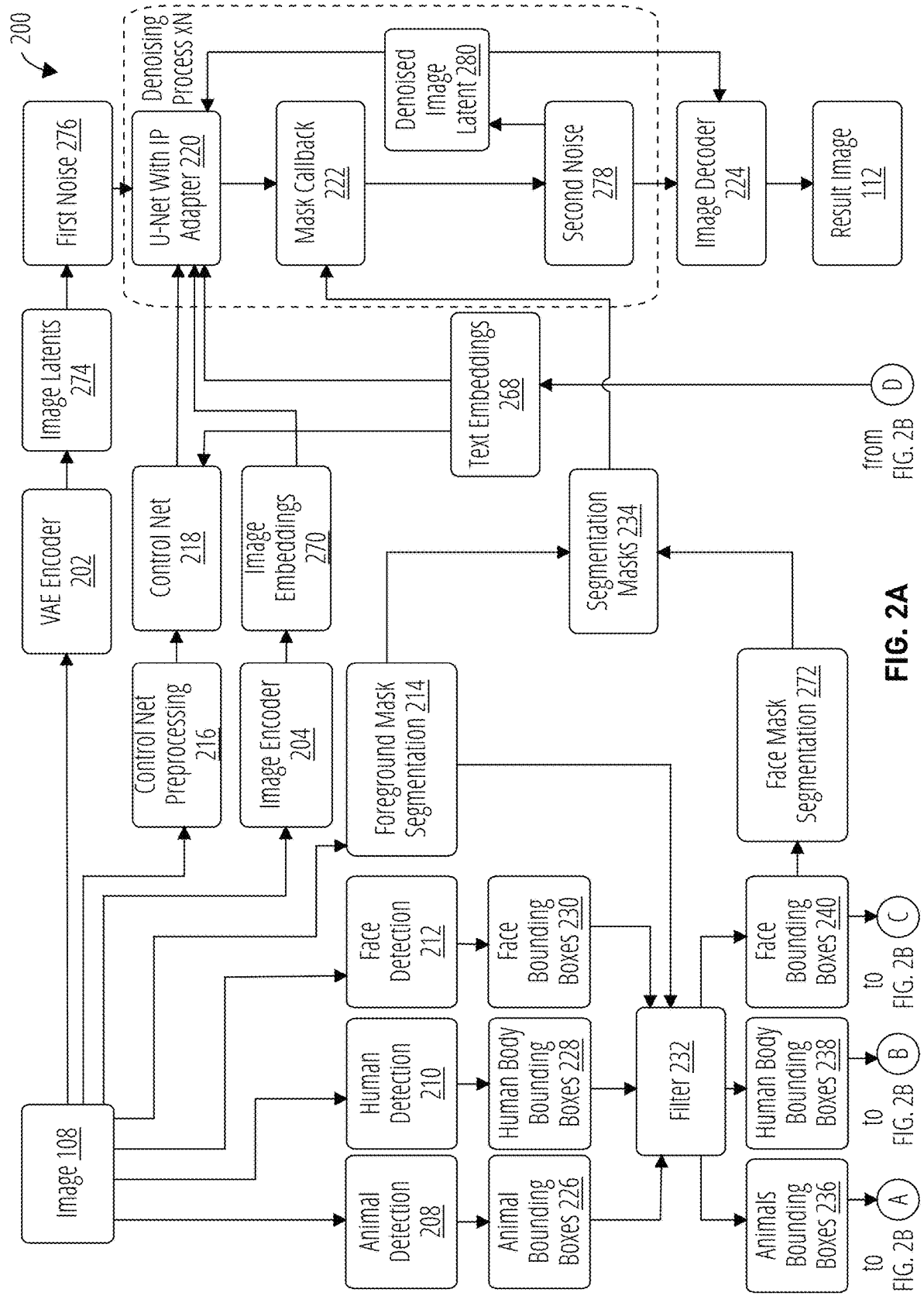
FIG. 2A is a block diagram showing modules of an image transformation system, according to an example embodiment.
Figure 2B:
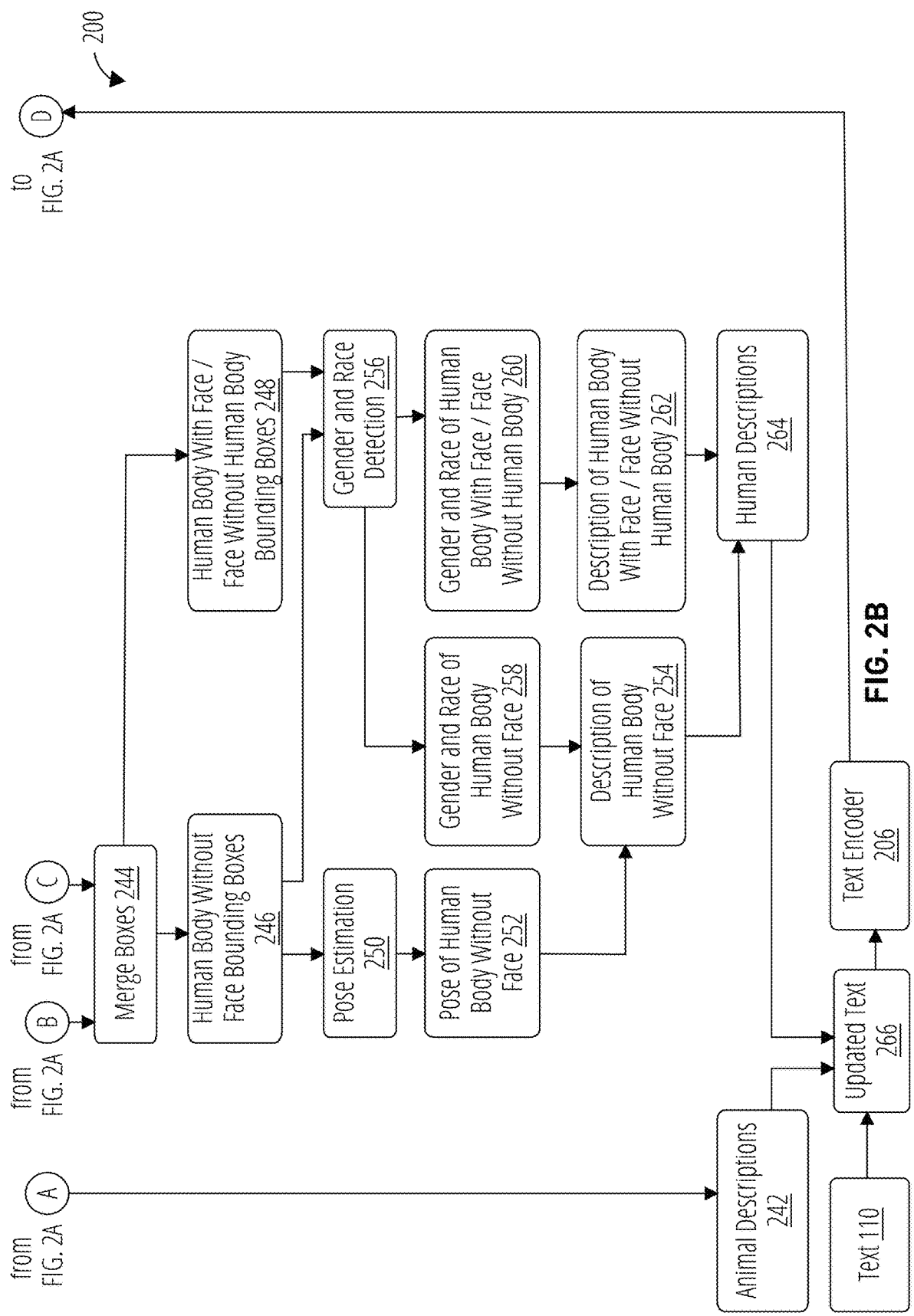
FIG. 2B is a continuation of the block diagram of FIG. 2A showing modules of the image transformation system, according to an example embodiment.

FIG. 2A and FIG. 2B are block diagrams showing modules of image transformation system 200, according to some example embodiments. The image transformation system 200 may include a Variational Autoencoder (VAE) encoder 202, an image encoder 204, a text encoder 206, an animal detection 208, a human detection 210, a face detection 212, a foreground mask segmentation 214, a control net preprocessing 216, a control net 218, a U-Net with Input Processing (IP) Adapter 220, a mask callback 222, and an image decoder 224. In other embodiments, image transformation system 200 may include fewer or more modules than shown in FIG. 2A and FIG. 2B.

Image transformation system 200 can receive an image 108 and a text 110. The image 108 may be provided to the animal detection 208, the human detection 210, and the face detection 212 nodes of the image transformation system 200. The models used in animal detection 208 and human detection 210 may include convolutional networks for object detection. The models may look for a predetermined number of classes of objects, for example, people and animals. Specifically, the animal detection 208 may be used for detecting animals (e.g., cats, dogs, horses, and so forth) in the image 108 and the human detection 210 may be used for human detection in the image 108. An example model used in animal detection 208 and human detection 210 may include You Only Look Once (YOLO®) object detection model. The face detection 212 may include a convolutional network used for detecting faces in image 108.

The image 108 may also be provided to the foreground mask segmentation 214. The mask of the main object in image 108 may be determined in foreground mask segmentation 214 using a foreground segmentation model. The foreground mask segmentation 214 is a convolutional network for foreground segmentation, which performs searching for foreground masks in an image. The foreground masks may include masks of main objects depicted in the image.

Animal detection 208 may detect the presence of one or more animals in the image 108 and output animal bounding boxes 226. Human detection 210 may detect the presence of one or more humans in image 108 and output human body bounding boxes 228. Face detection 212 may detect the presence of one or more faces in the image 108 and output face bounding boxes 230. A bounding box is a rectangle that contains a single specific object in image 108. Specifically, each of animal bounding boxes 226 is a rectangle that includes an animal in the image 108, each human body bounding boxes 228 is rectangle that include a human in the image 108, and each of face bounding boxes 230 is rectangle that include a face in the image 108.

Accordingly, in the original image 108, the mask of the main object is determined using the foreground mask segmentation 214, bounding boxes for humans and animals are found in animal detection 208 and human detection 210 using the object detection models (e.g., YOLO®), and bounding boxes for faces are found in face detection 212 using a model for face detection.

The animal bounding boxes 226, human body bounding boxes 228, face bounding boxes 230, and the foreground mask determined in foreground mask segmentation 214 are provided to a filter 232. The filter 232 may perform filtering of bounding boxes that do not cover the foreground mask. Accordingly, in the filtration step in filter 232, only those animal bounding boxes 226, human body bounding boxes 228, and face bounding boxes 230 that intersect the foreground mask are kept. The foreground mask determined in foreground mask segmentation 214 is also added to segmentation masks 234.

Upon filtering animal bounding boxes 226, human body bounding boxes 228, and face bounding boxes 230 in filter 232, animals bounding boxes 236, human body bounding boxes 238, and face bounding boxes 230, respectively, may be obtained.

The animals bounding boxes 236 may then be provided to animal descriptions 242. The animal descriptions 242 generates a list of species and breeds of animals found in the image 108. The human body bounding boxes 238 and the face bounding boxes 240 may be provided to merge boxes 244. The merge boxes 244 perform matching human body bounding boxes 238 to face bounding boxes 240. As a result, three example embodiments may appear. Specifically, upon merging, the merge boxes 244 may generate human body without face bounding boxes 246 (the first example embodiment). Each of the human body without face bounding boxes 246 includes a human body for which no matching face was found. The merge boxes 244 may also generate human body with face/face without human body bounding boxes 248. A box from the human body with face/face without human body bounding boxes 248 may include a human body with the faces. Accordingly, the human body with face/face without human body bounding boxes 248 include human bodies for which matching faces are found (second example embodiment). A box from the human body with face/face without human body bounding boxes 248 may also include a face without human body. Thus, the human body with face/face without human body bounding boxes 248 may include faces for which no matching human body were found (third example embodiment).

The human body without face bounding boxes 246 are then provided to pose estimation 250. The pose of human body without face 252 predicted by pose estimation 250 can indicate whether human body without face bounding boxes 246 include the back or the front of the body. Additionally, pose estimation 250 (such as DensePose model for dense human pose estimation) may predict a pose of the person in image 108, for example, whether the person is facing away or facing the camera. The pose may be determined based on body landmarks using, for example, a model for whole-body pose estimation known as DWpose. This information relating to the pose of the human body without face may be written to description of human body without face 254. This information eliminates problems of generating random faces on the human belly or generating random faces on the front of the person or on the back of the person.

The human body without face bounding boxes 246 and the human body with face/face without human body bounding boxes 248 are then provided to gender and race detection 256. The gender and race detection 256 are models that predict a gender and a race, and ethnicity for humans found in bounding boxes 246 and 248. In an example embodiment, MiVOLO® model may be used for gender or race detection.

The information from the gender and race detection 256 may be divided into gender and race of human body without face 258 and gender and race of human body with face/face without human body 260. The information from gender and race of human body without face 258 may be provided to description of human body without face 254. The information from the gender and race of human body with face/face without human body 260 may be provided to description of human body with face/face without human body 262. The description of human body without face 254 and the description of human body with face/face without human body 262 may be combined into human descriptions 264. The human descriptions 264 may include a list of detected humans with their gender, race, and pose. The human descriptions 264 may include descriptions of human bodies without faces and descriptions of human bodies with faces and/or descriptions of faces without human bodies. Accordingly, all the information about animals and humans may be collected into animal descriptions 242 and human descriptions 264.

The text 110, the animal descriptions 242, and the human descriptions 264 may be combined to generate an updated text 266. The example features added to the text 110 may include "a woman facing forward facing the camera," "a Caucasian man facing away from the camera," "a girl raising her right hand," and so forth. For example, if original text 110 includes "woman portrayed in an anime style" and pose estimation 250 determines that image 108 includes a woman facing forward, then the text 110 can be modified to "a woman facing forward in anime style." In an example embodiment, the image transformation system 200 may use predetermined templates to update the text description in text 110 based on the animal descriptions 242 and the human descriptions 264.

The updated text 266 may be provided to the text encoder 206. Text encoder 206 may transform the updated text 266 to text embeddings 268. The text embeddings 268 may refer to a numerical representation of a text in a latent space. The latent space of text embeddings 268 aligns with the latent space of image embeddings 270 generated by the image encoder 204. The text encoder 206 can be Contrastive Language-Image Pretraining (CLIP), or other networks designed to transform the text into text embeddings.

The face bounding boxes 240 may also be provided to face mask segmentation 272. Face mask segmentation 272 may include a convolutional network for face segmentation of the face bounding boxes 240 that performs searching for face masks in the face bounding boxes 240. The face masks detected by the face mask segmentation 272 and the foreground masks detected by the foreground mask segmentation 214 may be added to the segmentation masks 234. The segmentation masks 234 may include foreground masks and face masks detected in the image 108. Accordingly, for face bounding boxes 240, face masks may be found by a model in the face mask segmentation 272. The foreground mask determined by the foreground mask segmentation 214 may be combined with the face masks determined in face mask segmentation 272 to form segmentation masks 234, which may then be passed to the mask callback 222.

The image 108 may be further provided to the VAE encoder 202. VAE encoder 202 may include a generative model that encodes input data into a probabilistic latent space and decodes it back to generate data, thereby enabling smooth data representation and generation. VAE encoder 202 may receive the image 108 in one of computer readable formats and encode the image 108 into image latents 274 (also referred to as a latent vector). Image latents 274 may refer to a numerical representation of the image 108 in a vector space associated with a diffusion model.

Image encoder 204 may receive the image 108 in one of computer readable formats and encode the image 108 into image embeddings 270. The image embeddings 270 may refer to a compressed, continuous, and typically lower-dimensional representation of the image 108 in a latent space. In some embodiments, image encoder 204 can be a convolutional neural network, for example, CLIP, or other type of network configured to extract meaningful features from images.

Control net preprocessing 216 analyzes the image 108 to determine additional inputs, including spatial conditioning features such as edge maps, pose maps, or key points, for precise regional transformations. The additional input may include sketches, outlines, and other features in the image 108. The control net 218 may include a neural network that controls diffusion models by adding extra conditions. Control net 218 can generate, based on text embeddings 268 and the additional input from the control net preprocessing 216, a control vector in an internal format readable by the U-net with IP adapter 220. In an example embodiment, a human pose, a normals map, an edges map may be used as spatial control in the control net 218.

Image transformation system 200 can generate a first noise 276 of the same size as the image latents 274. This first noise 276 typically consists of randomly generated Gaussian noise for a specific portion of image latents 274 that corresponds to a section of the image 108. The first noise 276 can be injected into the image latents 274 to obtain noisy image latent. The noisy image latent may be processed by U-net with IP adapter 220.

U-net with IP adapter 220 may include a U-net and an IP Adapter. U-Net is a convolutional neural network developed for image segmentation. U-Net may include cross-attention layers to integrate the text embeddings 268, the image embeddings 270, and a control vector generated by control net 218. U-Net is trained to predict the second noise 278, which represents the residual noise present in the noisy image latent. This second noise is subtracted from the noisy latent to iteratively refine it toward the denoised latent. The denoised latent aligns with the true data distribution, approximating the probability distribution of clean image latents derived from the training dataset.

The IP Adapter is an image prompt adapter configured to integrate seamlessly with diffusion models, enabling image prompting without requiring any modifications to the underlying model. IP Adapter can be an additional module or component that modifies how the input data is processed before being fed to the U-Net. Combining the U-Net with the IP Adapter allows incorporating additional inputs and control mechanisms to enhance the image processing capabilities of the U-Net. The IP Adapter can process the image embeddings 270 to extract useful information or modify the image embeddings 270 to ensure that the U-Net generates correct output.

Mask callback 222 can generate a mask determining how different parts of image 108 are processed. Specifically, mask callback 222 creates a mask that defines to what extent to process and change different parts of the image 108 (for example, faces, facial features, other elements of foreground, and so forth). Accordingly in some embodiments, image transformation system 200 can generate different first noise 276 (and correspondingly, second noise 278) for various portions of the image 108, allowing specific regions to be modified differently. This targeted approach ensures that some areas of the image 108 are altered less or more than others, enabling the application of different styles to specific sections based, for example, on the prompts provided in text 110. The first noise 276 can be injected only into the part of image latents 274 that corresponds to a region of the image 108 defined by the mask.

The image transformation system 200 may utilize second noise 278 to obtain a denoised image latent 280 by applying a linear transformation to the noisy image latent. The denoised image latent 280 can then be processed by U-net with IP adapter 220 to update second noise 278, which in turn can be used to update the denoised image latent 280. This iterative process of predicting second noise 278 and updating denoised image latent 280 can be repeated several times (e.g., five or xN times) until the denoised image latent 280 converges to image latents belonging to the true data distribution of embedding corresponding to images. Thus, the iterative process progressively aligns the denoised image latent 280 with the desired data distribution and achieves high-quality stylization.

After the iterative denoising steps, the denoised image latent 280 and the second noise 278 are provided to image decoder 224. The image decoder 224, which may include a VAE decoder, processes the refined denoised image latent 280 to generate a result image 112 that aligns with the stylistic instructions while preserving the key features of the original image 108.

Figure 3:
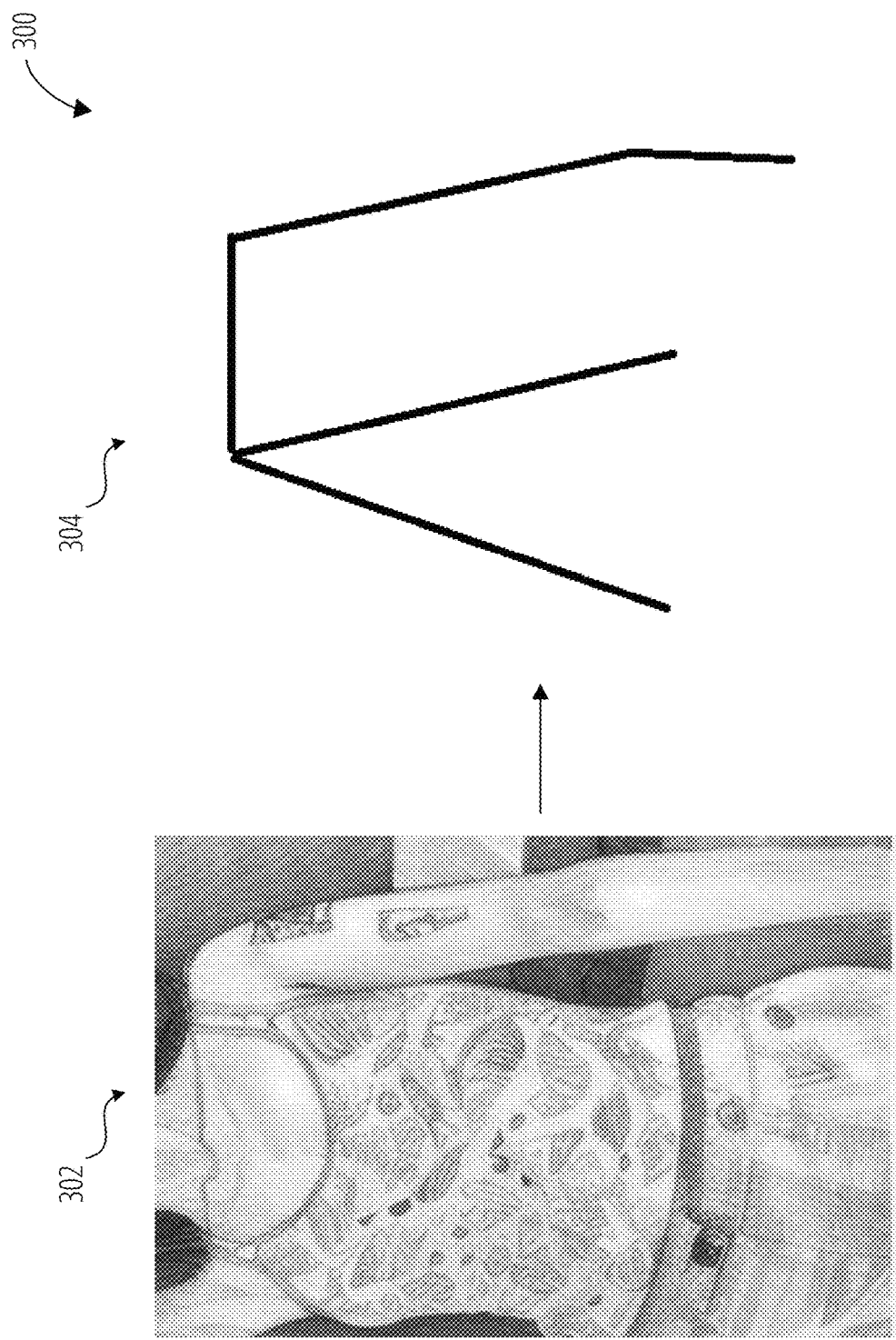
FIG. 3 is a schematic showing an example image and a skeleton of a person present in the image, according to an example embodiment.

FIG. 3 is a schematic 300 showing an example image 302 and skeleton 304 of a person present in image 302. Pose estimation 250 (shown in FIG. 2A) may include a neural network that generates skeleton 304 from the image 302. Points in skeleton 304 can be assigned colors indicating a coordinate of the points from the point of view of the camera. In some embodiments, the skeleton 304 can be generated by DensePose model.

Pose estimation 250 may include a model that determines the pose of the person in image 302. For example, if the coordinate of the left shoulder is less than the coordinate of the right shoulder, then the person is facing forward. If the shoulders are not visible, the model may analyze the hips. If the coordinate of the left hip is smaller than the right hip, then the person is facing forward. On the contrary, if the coordinate of the right shoulder (or hip) is smaller than the left one, then the person is facing backwards.

In example of FIG. 3, the left shoulder is less than the coordinate of the right shoulder. It means that the person is facing forward. Accordingly, if original text 110 (shown in FIG. 2A) includes "woman in anime style," then the text 110 can be modified to "woman in anime style in front."

Figure 4:
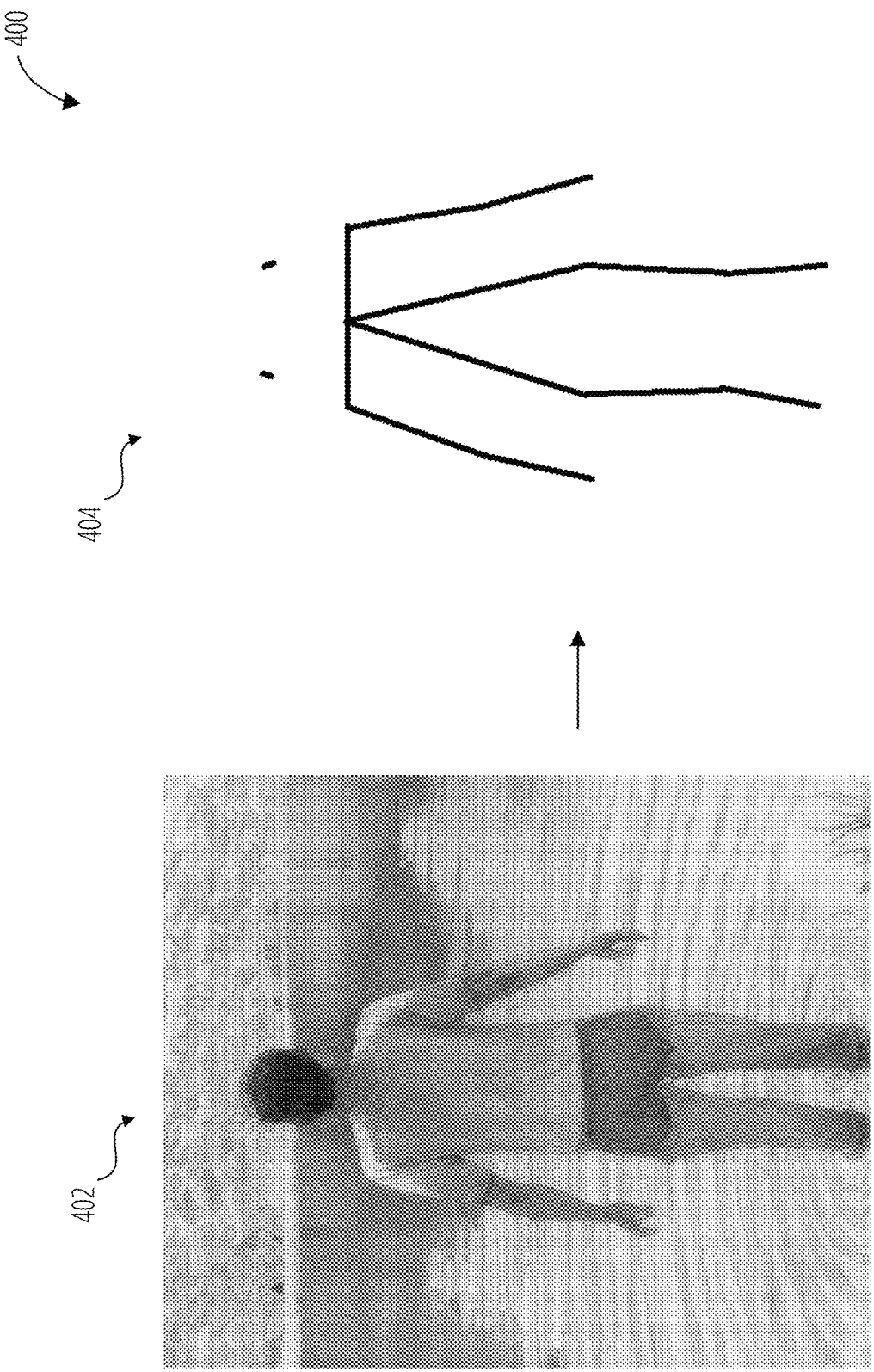
FIG. 4 is a schematic showing an example image and a skeleton of a person present in the image, according to an example embodiment.

FIG. 4 is a schematic 400 showing an example image 402 and skeleton 404 of a person present in image 402. In image 402, a person is shown in full length. In corresponding skeleton 404, the left shoulder and the right shoulder have the same coordinate from the point of view of the camera. However, the coordinate of the right hip is smaller than the coordinate of the left hip. It means that the person is facing backwards. Accordingly, if original text 110 includes "a man in anime style," then the text 110 can be modified to "body of man in anime style from behind."

Figure 5:
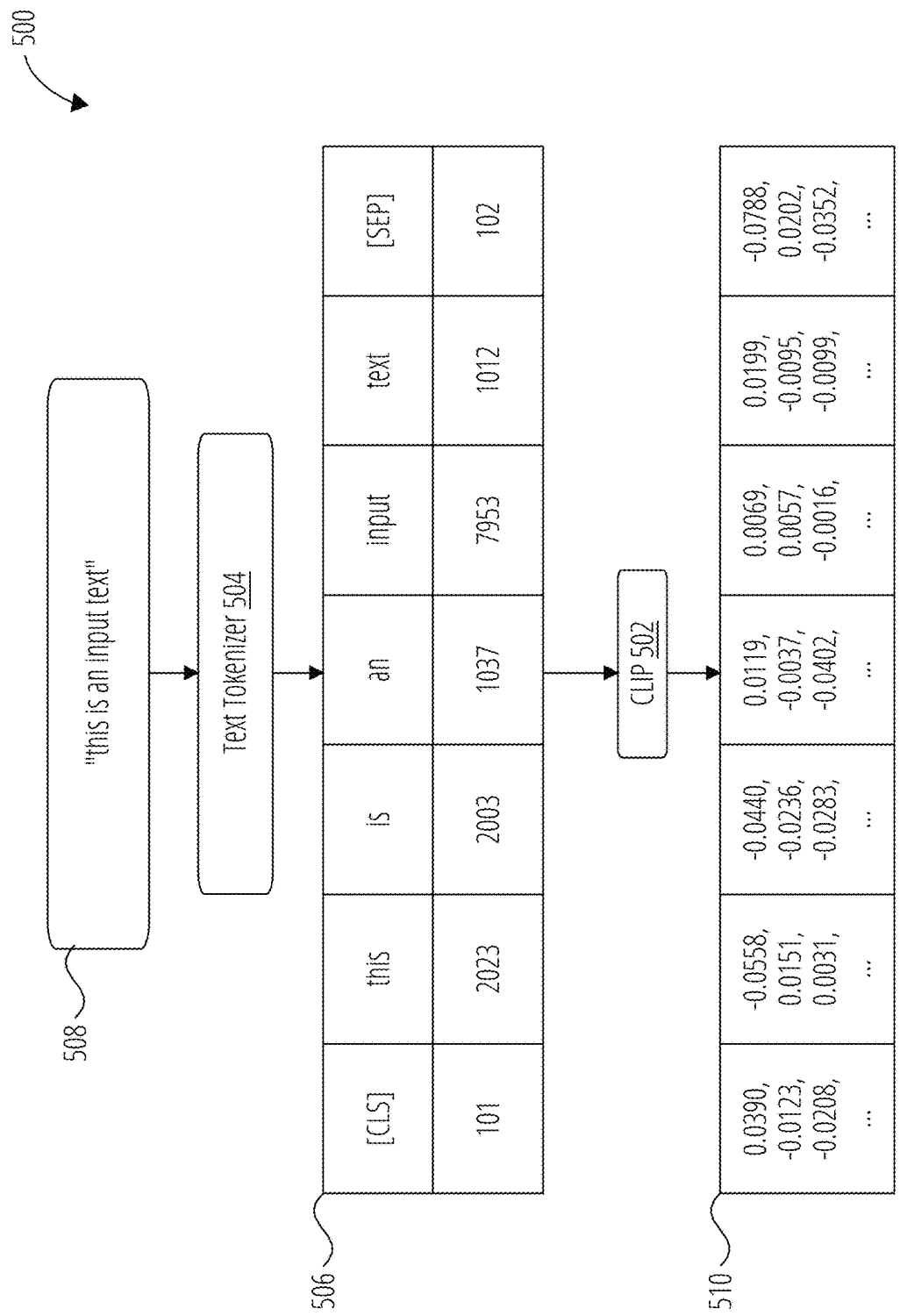
FIG. 5 is a block diagram illustrating, in detail, a text encoder, according to an example embodiment.

FIG. 5 is a block diagram 500 showing details of converting text into text embedding (shown in FIG. 2A), according to an example embodiment. In the example of FIG. 2A and FIG. 2B, CLIP 502 is used as text encoder 206 shown in FIG. 2B.

Text tokenizer 504 may generate text tokens 506 from raw text 508, for example, text 110. Then, text tokens 506 can be provided to CLIP 502 to generate text embeddings 510.

Figure 6A:
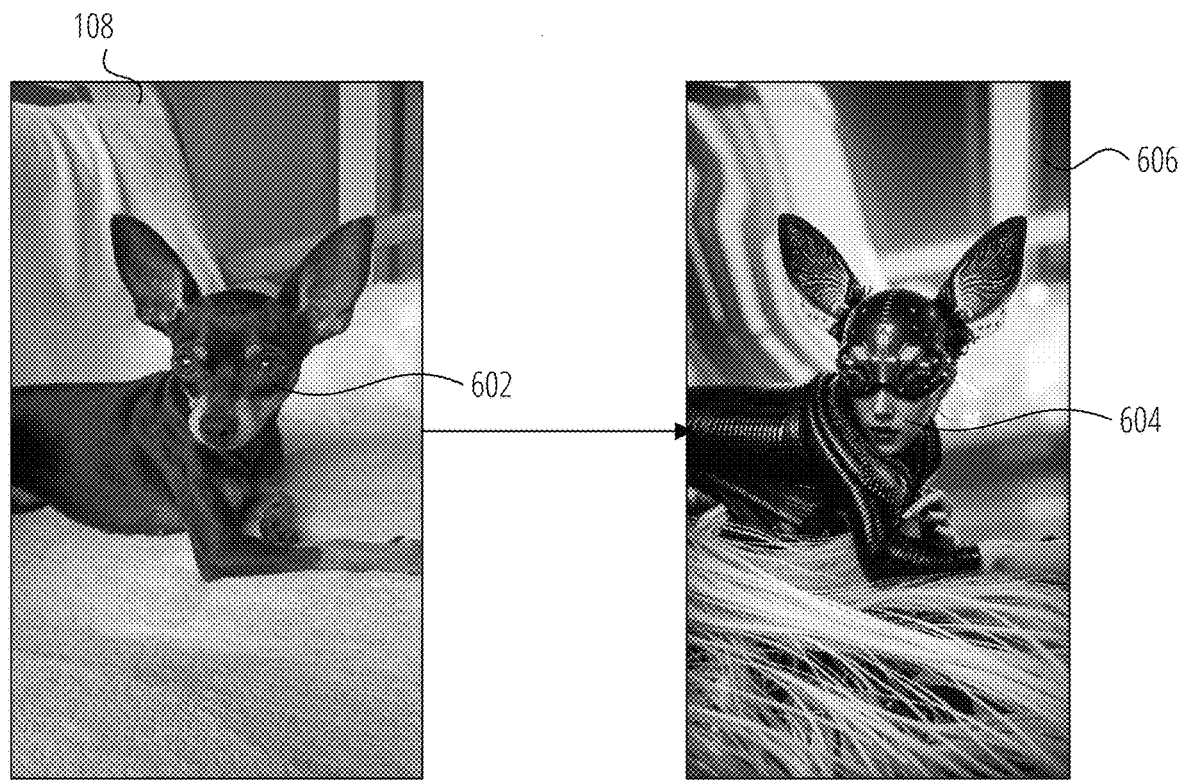
FIG. 6A is a schematic showing processing of an image by an image transformation system, according to an example embodiment.
Figure 6B:
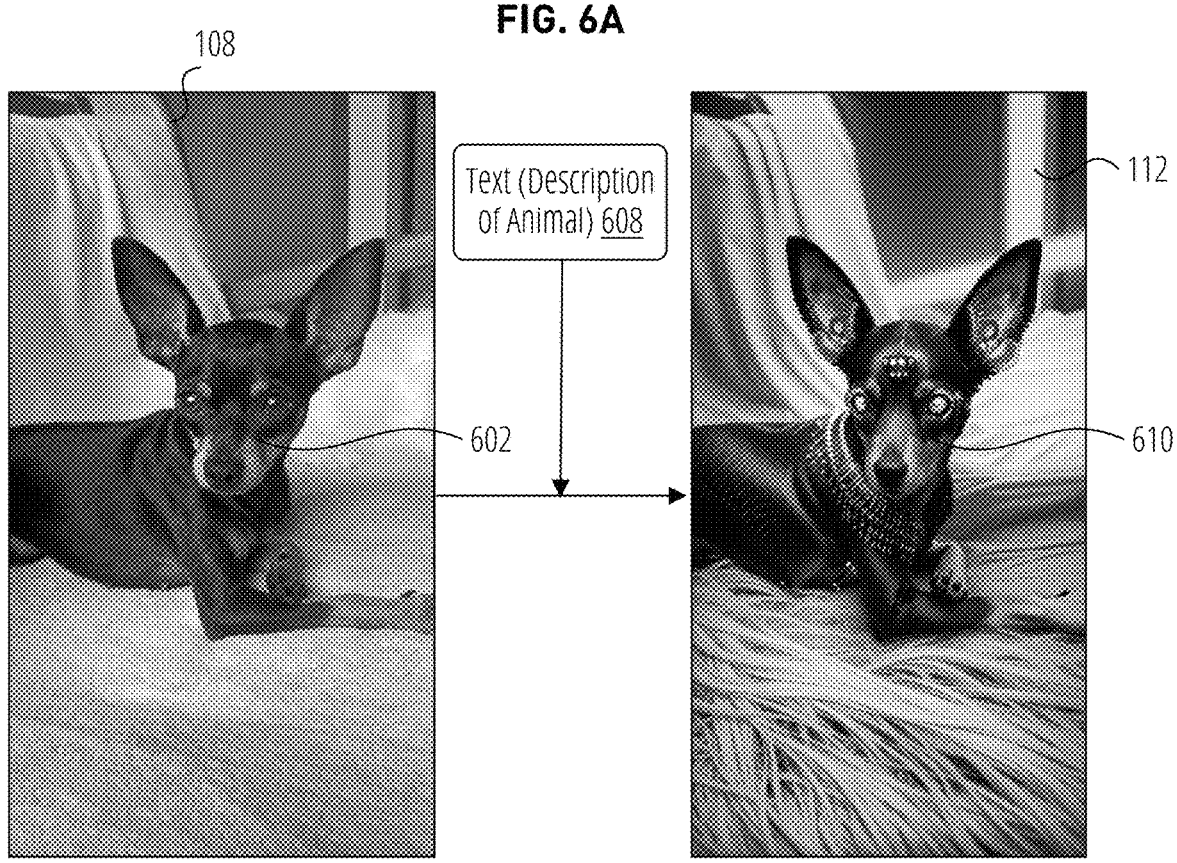
FIG. 6B is a schematic showing processing of an image by an image transformation system based on description of an animal, according to an example embodiment.

FIG. 6A and FIG. 6B are schematics showing processing of an image by an image transformation system 200, according to an example embodiment. An image 108 may be provided to the image transformation system 200. The image 108 may have an animal 602 depicted in the image 108. FIG. 6A shows processing of the image 108 when no text containing description of the animal 602 is provided to the image transformation system 200. Specifically, in absence of the text containing description of the animal 602, the image transformation system 200 may determine that the main object in the image 108 is not the animal 602, but a human 604. As a result, upon transforming the image 108 into a stylized image 606, the human 604 in a stylized form may be depicted in the stylized image 606 instead of the animal 602 in a stylized form.

FIG. 6B shows processing of the image 108 when text 608 containing description of the animal 602 is provided to the image transformation system 200. Specifically, the image transformation system 200 may process the image 108 and the text 608 (e.g., a dog) and determine that the main object in the image 108 is the animal 602. As a result, upon transforming the image 108 into a result image 112, the animal 610 in a stylized form may be depicted in the result image 112.

Figure 7A:
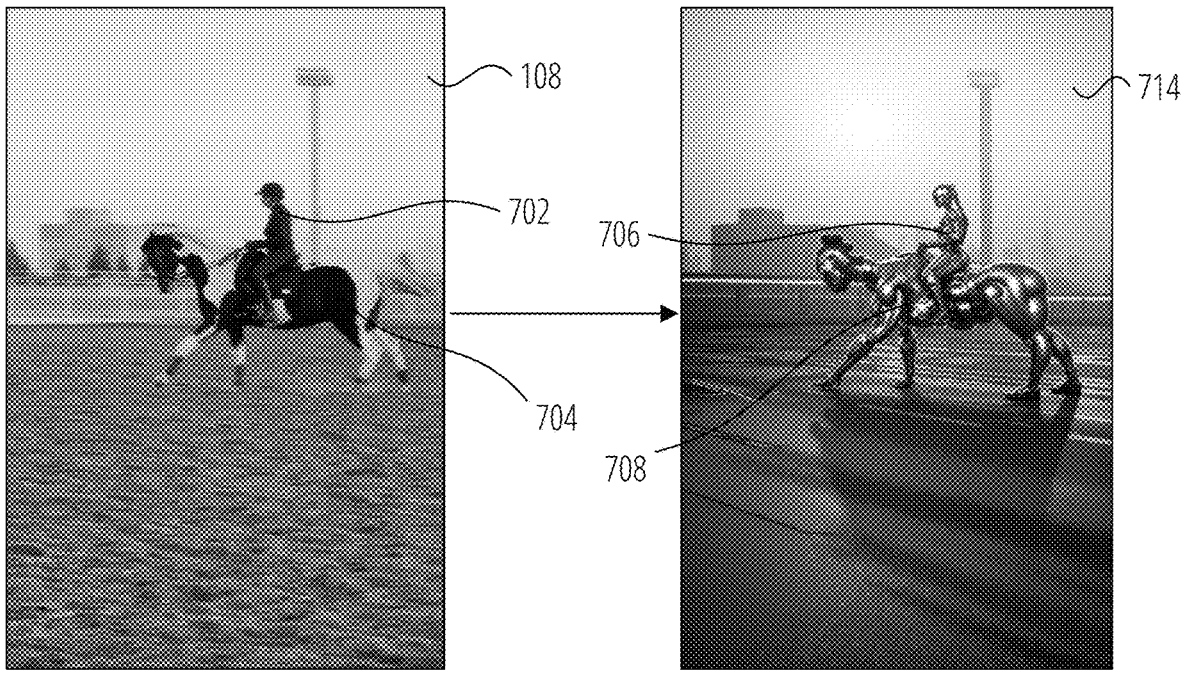
FIG. 7A is a schematic showing processing of an image by an image transformation system, according to an example embodiment.
Figure 7B:
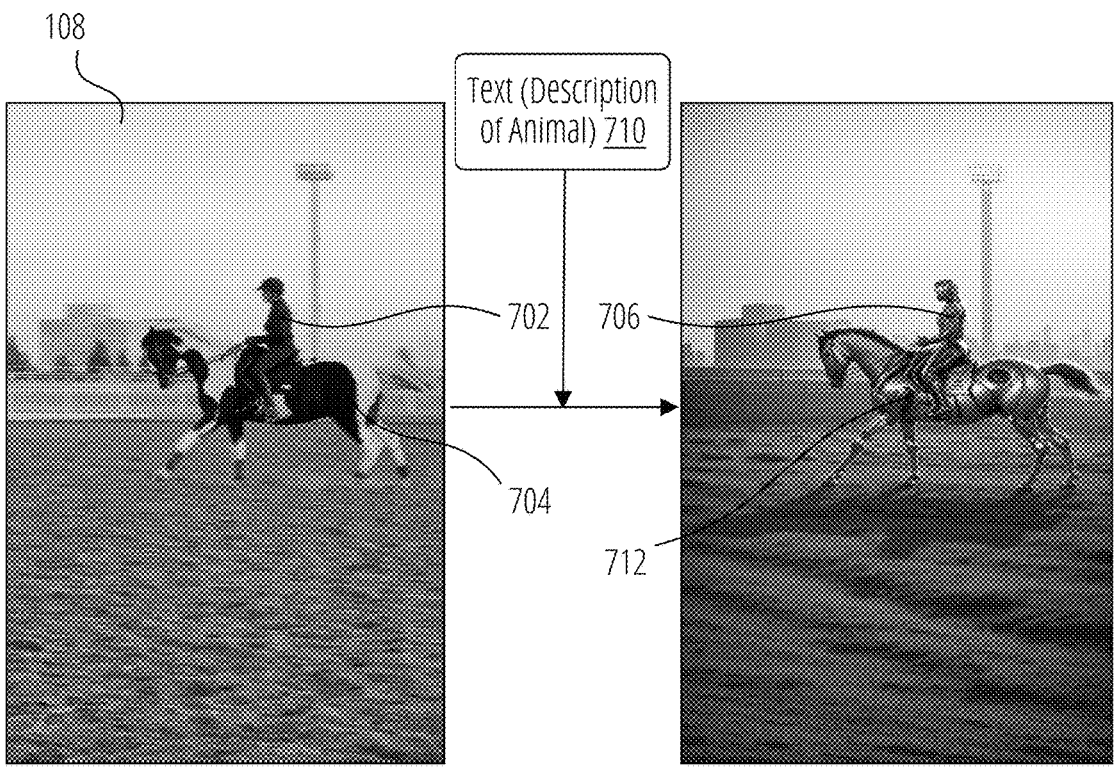
FIG. 7B is a schematic showing processing of an image by an image transformation system based on description of an animal, according to an example embodiment.

FIG. 7A and FIG. 7B are schematics showing processing of an image by an image transformation system 200, according to an example embodiment. An image 108 may be provided to the image transformation system 200. A human 702 and an animal 704 may be depicted in the image 108. FIG. 7A shows processing of the image 108 when no text containing description of the animal 704 is provided to the image transformation system 200. Specifically, in absence of the text containing description of the animal 704, the image transformation system 200 may determine that the main objects in the image 108 are two humans. As a result, upon transforming the image 108 into a stylized image 606, the human 706 in a stylized form riding another human 708 in a stylized form may be depicted in the stylized image 714 instead of depicting the human riding a horse.

FIG. 7B shows processing of the image 108 when text 710 containing description of the animal 704 (e.g., a horse) is provided to the image transformation system 200. Specifically, the image transformation system 200 may process the image 108 and the text 710 and determine that the main objects in the image 108 are the human 702 and the animal 704. As a result, upon transforming the image 108 into a result image 112, the human 706 in a stylized form riding an animal 712 (a horse) in a stylized form may be depicted in the result image 112.

Figure 8A:
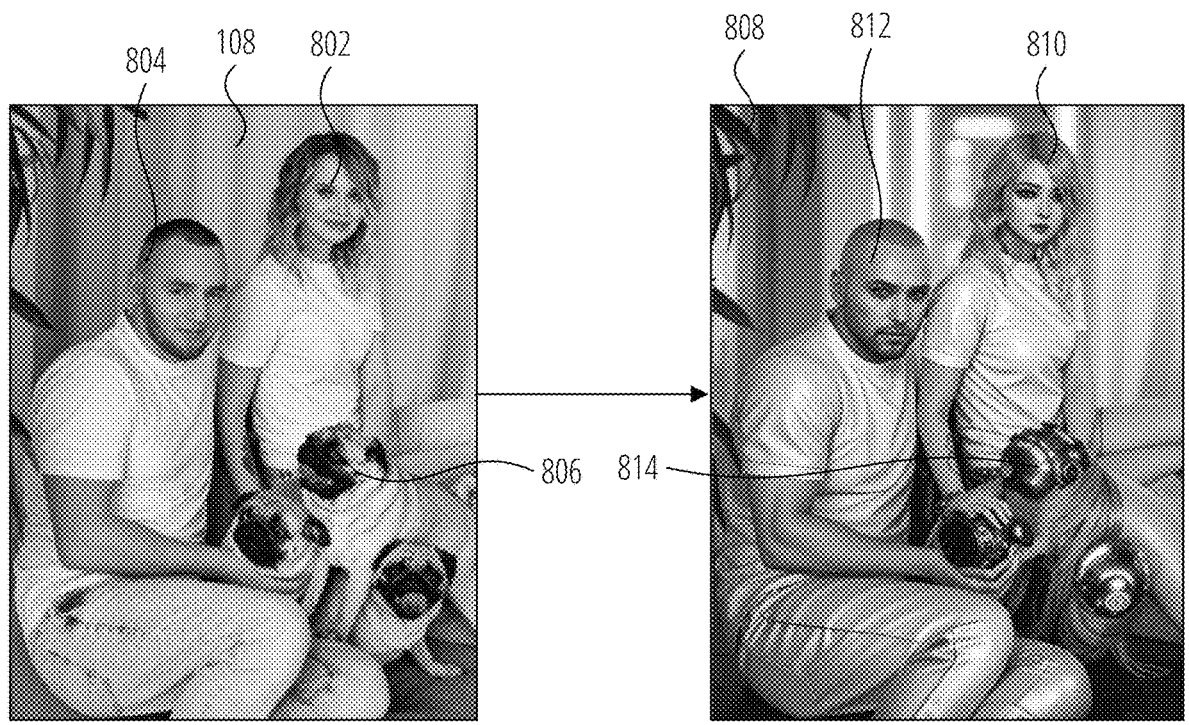
FIG. 8A is a schematic showing processing of an image by an image transformation system, according to an example embodiment.
Figure 8B:
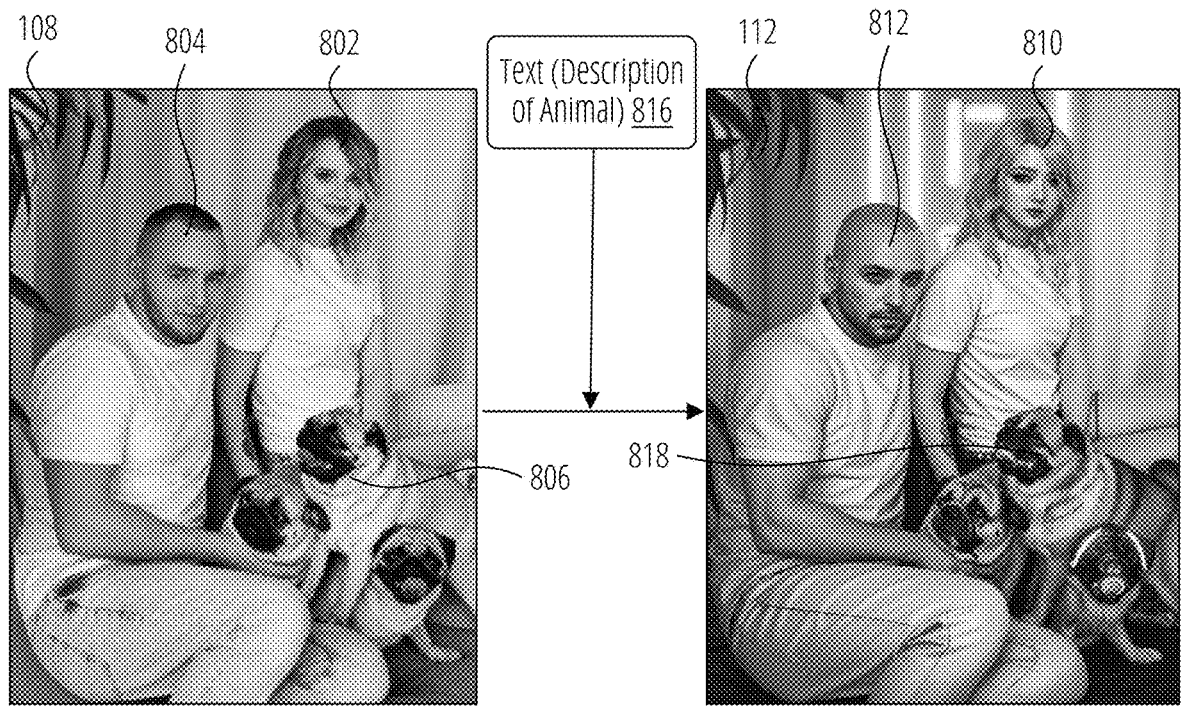
FIG. 8B is a schematic showing processing of an image by an image transformation system based on description of an animal, according to an example embodiment.

FIG. 8A and FIG. 8B are schematics showing processing of an image by an image transformation system 200, according to an example embodiment. An image 108 may be provided to the image transformation system 200. Humans 802 and 804 and animals 806 may be depicted in the image 108. FIG. 8A shows processing of the image 108 when no text containing description of the animals 806 is provided to the image transformation system 200. Specifically, in absence of the text containing description of the animals 806, the image transformation system 200 may determine that the main objects in the image 108 are two humans and some objects. As a result, upon transforming the image 108 into a stylized image 808, the humans 810 and 812 in a stylized form and some objects 814 in a stylized form, which are not animals, may be depicted in the stylized image 808.

FIG. 8B shows processing of the image 108 when text 816 containing description of the animals 806 (e.g., dogs) is provided to the image transformation system 200. Specifically, the image transformation system 200 may process the image 108 and the text 816 and determine that the main objects in the image 108 are the humans 802 and 804 and the animals 806. As a result, upon transforming the image 108 into a result image 112, the humans 810 and 812 in a stylized form and animals 818 (dogs) in a stylized form may be depicted in the result image 112.

Figure 9A:
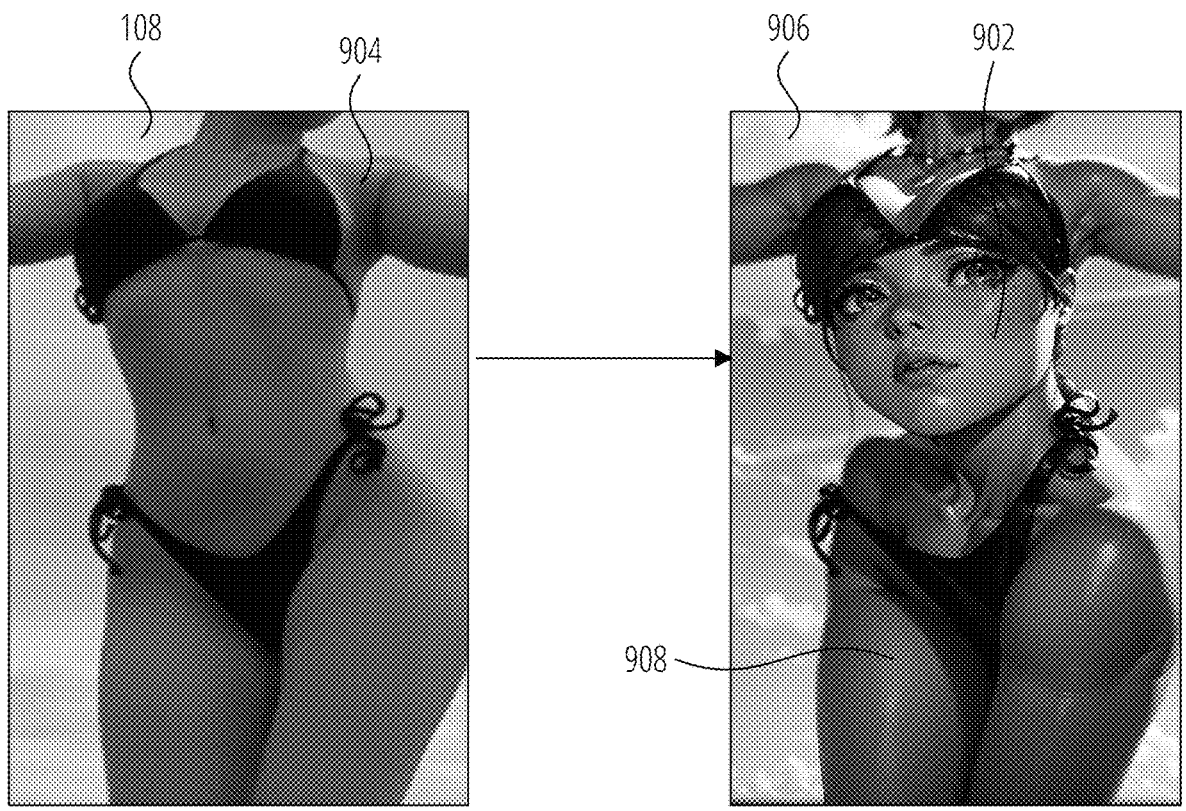
FIG. 9A is a schematic showing processing of an image by an image transformation system, according to an example embodiment.
Figure 9B:
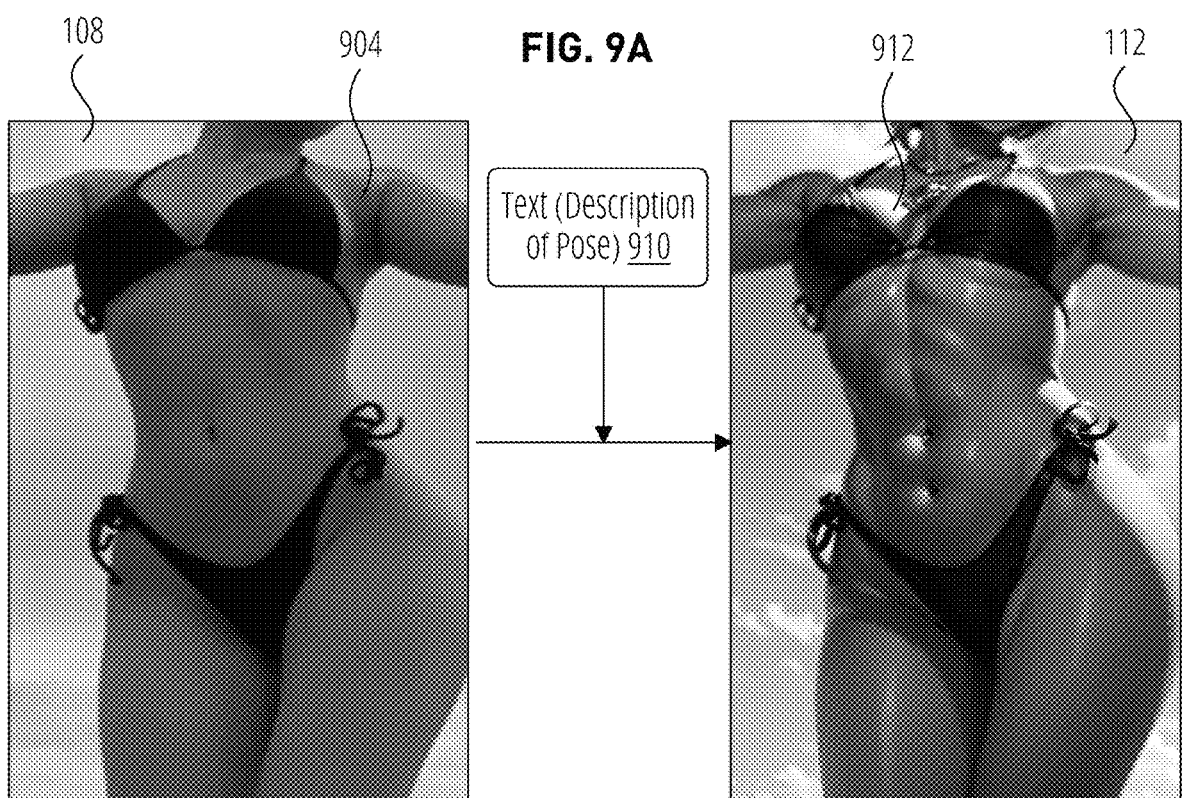
FIG. 9B is a schematic showing processing of an image by an image transformation system based on a description of a pose, according to an example embodiment.

FIG. 9A and FIG. 9B are schematics showing processing of an image by an image transformation system 200, according to an example embodiment. An image 108 may be provided to the image transformation system 200. The image 108 may have a body 904 without a face depicted in the image 108. FIG. 9A shows processing of the image 108 when no text containing description of the pose of the body 904 is provided to the image transformation system 200. Specifically, in absence of the text containing description of the pose of the body 904, the image transformation system 200 may determine that the main object in the image 108 is a body having a face. As a result, upon transforming the image 108 into a stylized image 906, a body 908 having a face 902 may be depicted in a stylized form in the stylized image 906.

FIG. 9B shows processing of the image 108 when text 910 containing description of the pose of the body 904 is provided to the image transformation system 200. Specifically, the image transformation system 200 may process the image 108 and the text 910 (e.g., a forwardly faced body without a face) and determine that the main object in the image 108 is the body that faces forward and has no face. As a result, upon transforming the image 108 into a result image 112, the body 912 without a face may be depicted in a stylized form in the result image 112.

Figure 10A:
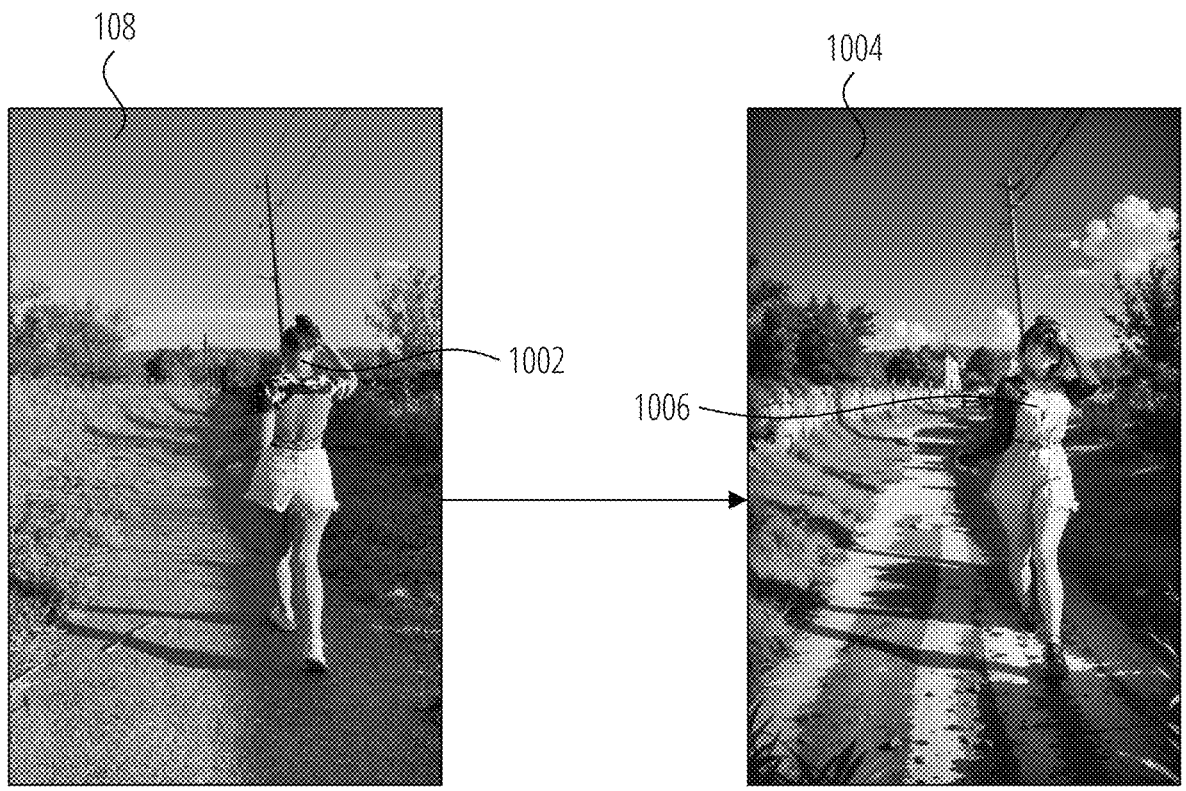
FIG. 10A is a schematic showing processing of an image by an image transformation system, according to an example embodiment.
Figure 10B:
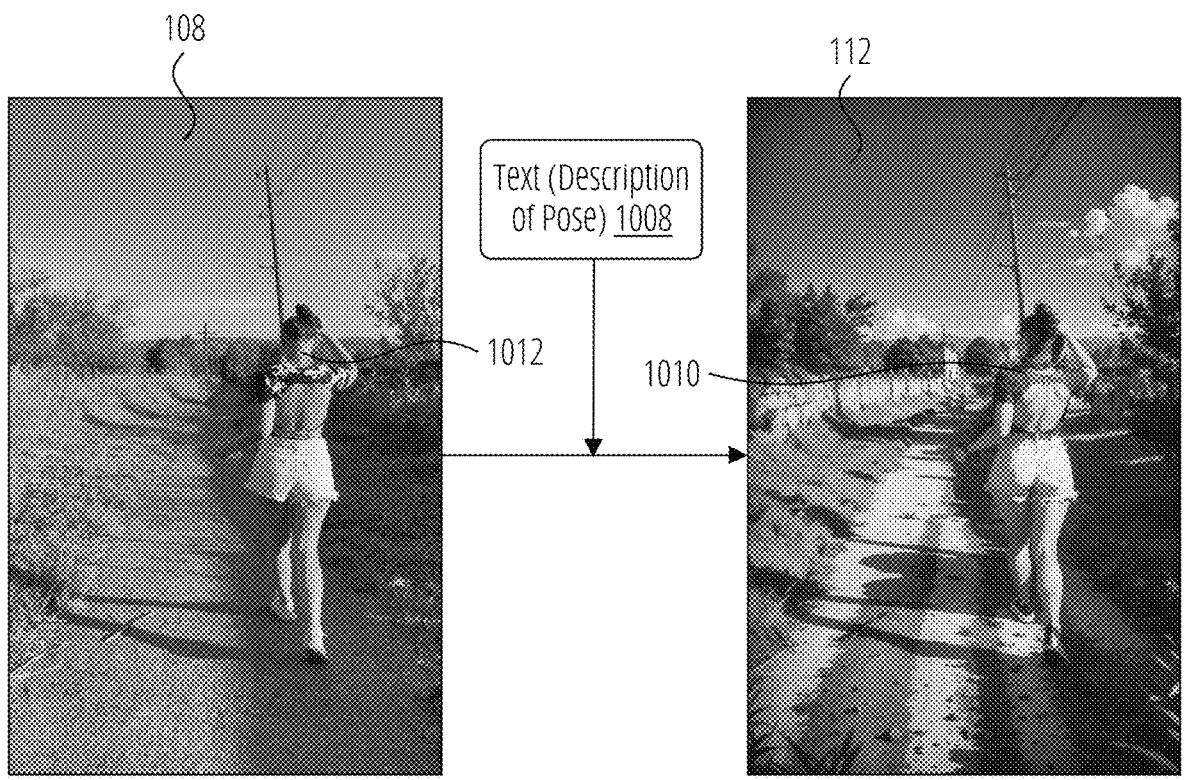
FIG. 10B is a schematic showing processing of an image by an image transformation system based on a description of a pose, according to an example embodiment.

FIG. 10A and FIG. 10B are schematics showing processing of an image by an image transformation system 200, according to an example embodiment. An image 108 may be provided to the image transformation system 200. The image 108 may have a body 1002 that has a face and is faced backwards. FIG. 10A shows processing of the image 108 when no text containing description of the pose of the body 1012 is provided to the image transformation system 200. Specifically, in absence of the text containing description of the pose of the body 1002, the image transformation system 200 may determine that the main object in the image 108 is a body that faces forward. As a result, upon transforming the image 108 into a stylized image 1004, a body 1006 that is faced forward may be depicted in a stylized form in the stylized image 906.

FIG. 10B shows processing of the image 108 when text 1008 containing description of the pose of the body 1002 is provided to the image transformation system 200. Specifically, the image transformation system 200 may process the image 108 and the text 1008 (e.g., the girl faced backwards) and determine that the main object in the image 108 is the body that has a face and is faced backwards. As a result, upon transforming the image 108 into a result image 112, the body 1010 having a face and faced backwards may be depicted in a stylized form in the result image 112.

Figure 11A:
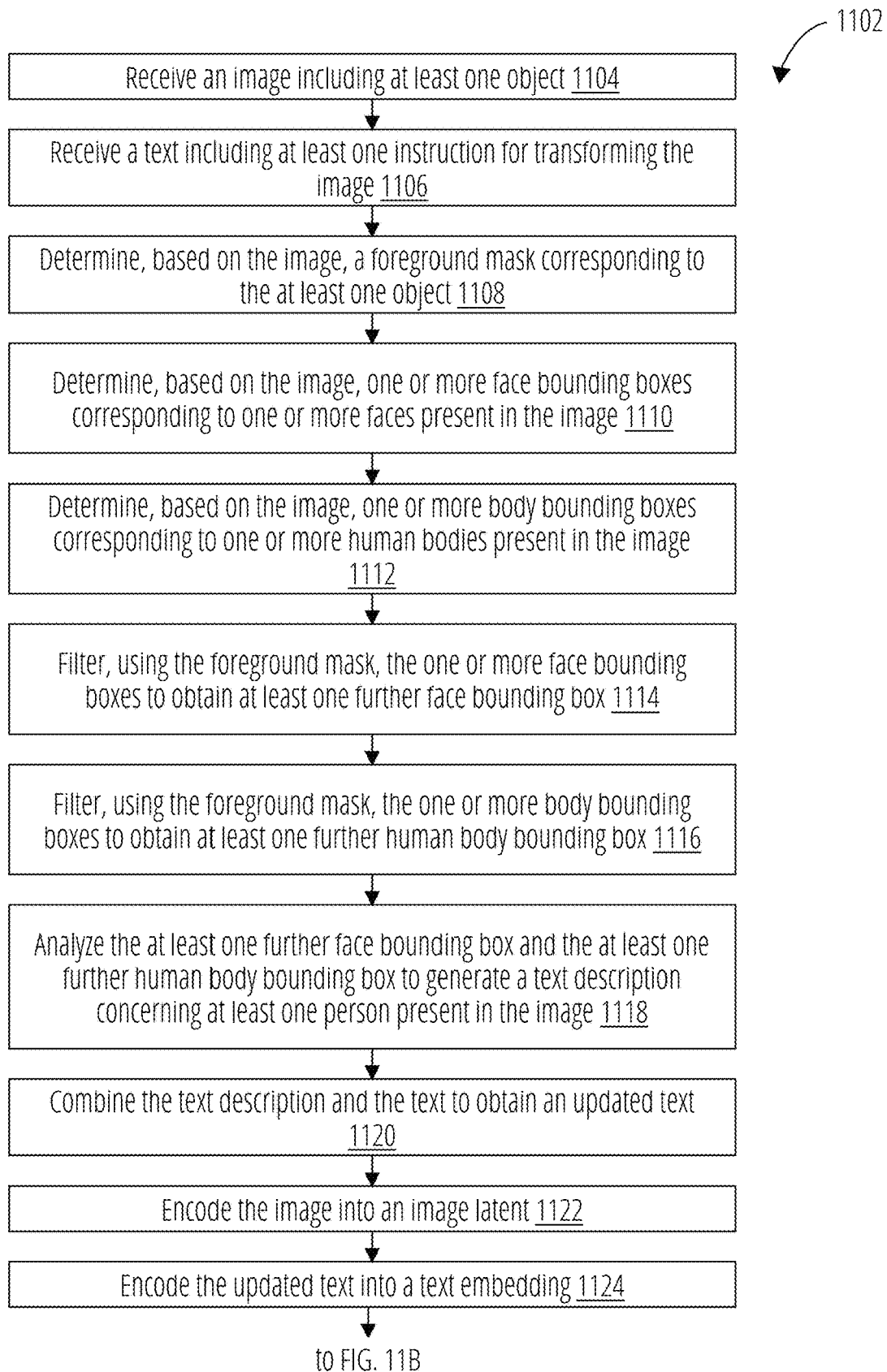
FIG. 11A a flow chart of a method for text-driven photo style adjustment with generative AI, according to an example embodiment.
Figure 11B:
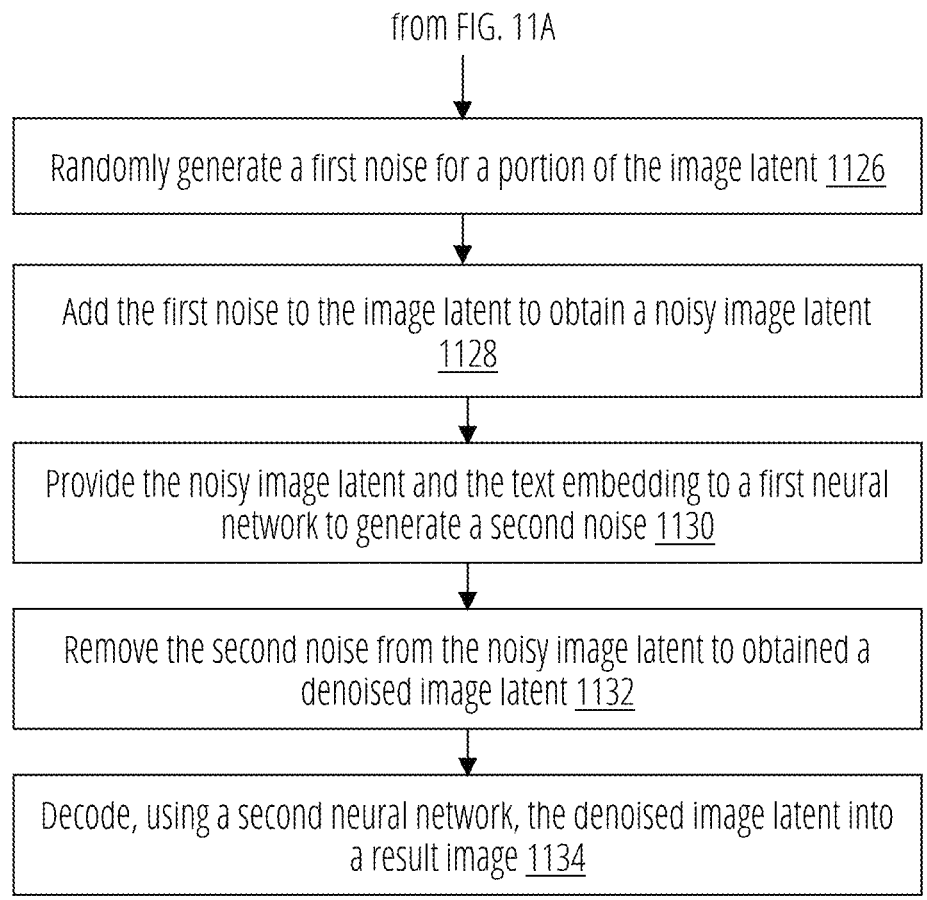
FIG. 11B a continuation of the flow chart of FIG. 11A of the method for text-driven photo style adjustment with generative AI, according to an example embodiment.

FIG. 11A and FIG. 11B show a flow chart of a method 1102 for text-driven photo style adjustment with generative AI, according to an example embodiment. In some embodiments, the operations of method 1102 may be combined, performed in parallel, or performed in a different order. Method 1102 may also include additional or fewer operations than those illustrated. Method 1102 may be performed by processing logic that comprises hardware (e.g., decision making logic, dedicated logic, programmable logic, and microcode), software (such as software run on a general-purpose computer system or a dedicated machine), or a combination of both.

The method 1102 may commence in block 1104 with receiving an image. The image may include at least one object. In block 1106, the method 1102 may proceed with receiving a text. The text may include at least one instruction for transforming the image.

Upon receiving the image, the method 1102 may proceed with determining, based on the image, a foreground mask corresponding to the at least one object in block 1108. The method 1102 may further include determining, in block 1110, based on the image, one or more face bounding boxes corresponding to one or more faces present in the image. The method 1102 may include determining, in block 1112, based on the image, one or more body bounding boxes corresponding to one or more human bodies present in the image. In an example embodiment, the one or more body bounding boxes may be determined using a pretrained neural network.

Upon determining the one or more face bounding boxes, the method 1102 may proceed with filtering, in block 1114, using the foreground mask, the one or more face bounding boxes to obtain at least one further face bounding box. Upon determining the one or more body bounding boxes, the method 1102 may proceed with filtering, in block 1116, using the foreground mask, the one or more body bounding boxes to obtain at least one further human body bounding box.

In block 1118, the method 1102 may proceed with analyzing the at least one further face bounding box and the at least one further human body bounding box to generate a text description concerning at least one person present in the image. In an example embodiment, the text description may be generated using a generative AI model.

In an example embodiment, the analysis of the at least one further face bounding box and the at least one further human body bounding box may include determining that the at least one further face bounding box matches the at least one further human body bounding box. In response to the determination that the at least one further face bounding box matches the at least one further human body bounding box, an indication that the image includes a human body with a face may be added to the text description. The method 1102 may further include extracting, from the at least one further face bounding box and the at least one further human body bounding box, information concerning one or more of the following: an age of a person present in the image, a gender of the person present in the image, and ethnicity of the person present in the image. The information may be added to the text description.

In an example embodiment, the analysis of the at least one further face bounding box and the at least one further human body bounding box may include determining that the at least one further human body bounding box mismatches the at least one further face bounding box. In response to the determination that the at least one further human body bounding box mismatches the at least one further face bounding box, an indication that the image includes a human body without a face may be added to the text description. The method 1102 may further include extracting, from the at least one further human body bounding box, information concerning a pose associated with the human body. The information may be added to the text description.

In block 1120, the method 1102 may include combining the text description and the text to obtain an updated text. In an example embodiment, the updated text may be generated using a predefined template. The method 1102 may further include encoding, in block 1122, the image into an image latent. In block 1124, the method 1102 may include encoding the updated text into a text embedding.

In an example embodiment, prior to encoding the updated text into the text embedding, the method 1102 may include determining, based on the image, one or more animal bounding boxes corresponding to one or more animals present in the image. Upon determining the one or more animal bounding boxes, the method 1102 may proceed with filtering, using the foreground mask, the one or more animal bounding boxes to obtain at least one further animal bounding box. The at least one further animal bounding box may be analyzed to generate an animal description concerning the one or more animals present in the image. The animal description may be added to the updated text.

The method 1102 may proceed in block 1126 with randomly generating a first noise for a portion of the image latent. In block 1128, the method 1102 may include adding the first noise to the image latent to obtain a noisy image latent. In block 1130, the method 1102 may proceed with providing the noisy image latent and the text embedding to a first neural network to generate a second noise. The method 1102 may include removing, in block 1132, the second noise from the noisy image latent to obtain a denoised image latent. In an example embodiment, the first neural network incorporates a U-Net architecture, designed for image-to-image tasks. The first neural network utilizes cross-attention mechanisms to integrate text embeddings and image latents, refining noisy latents into high-fidelity outputs.

In an example embodiment, the method 1102 may further include combining the at least one further face bounding box and the foreground mask to generate a segmentation mask. The first noise and the second noise may be generated solely for the portion of the image latent. The portion of the image latent may correspond to a part of the image, where the part is obtained by applying the segmentation mask to the image.

In block 1134, the method 1102 may include decoding, using a second neural network, the denoised image latent into a result image. In an example embodiment, prior to decoding the denoised image latent, the method 1102 may include repeating the following steps until the denoised image latent converges into a further image latent: 1) providing the denoised image latent and the text embedding to the first neural network to update the second noise and 2) removing the second noise from the denoised image latent.

Figure 12:
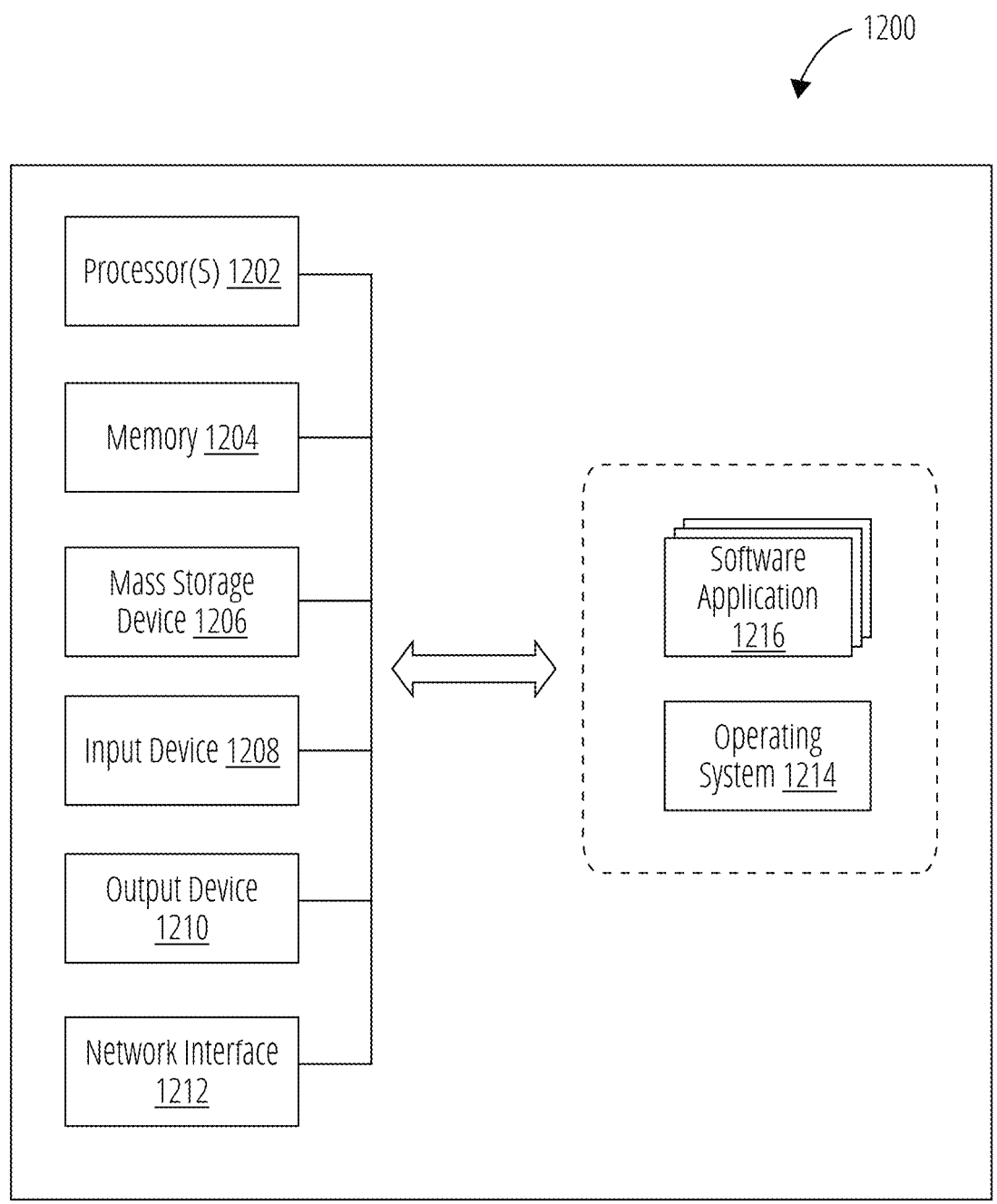
FIG. 12 is a high-level block diagram illustrating an example computer system, within which a set of instructions for causing the machine to perform any one or more of the methodologies discussed herein can be executed.

FIG. 12 is a high-level block diagram illustrating an example computer system 1200, within which a set of instructions for causing the machine to perform any one or more of the methodologies discussed herein can be executed. The computer system 1200 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 1200 is an example of computing device 102 shown in FIG. 1. Notably, FIG. 12 illustrates just one example of the computer system 1200 and, in some embodiments, the computer system 1200 may have fewer elements/modules than shown in FIG. 12 or more elements/modules than shown in FIG. 12.

The computer system 1200 may include one or more processor(s) 1202, a memory 1204, one or more mass storage devices 1206, one or more input devices 1208, one or more output devices 1210, and a network interface 1212. The processor(s) 1202 are, in some examples, configured to implement functionality and/or process instructions for execution within the computer system 1200. For example, the processor(s) 1202 may process instructions stored in the memory 1204 and/or instructions stored on the mass storage devices 1206. Such instructions may include components of an operating system 1214 or software applications 1216. The computer system 1200 may also include one or more additional components not shown in FIG. 12, such as a body, a power supply, a power supply, a global positioning system (GPS) receiver, and so forth.

The memory 1204, according to one example, is configured to store information within the computer system 1200 during operation. The memory 1204, in some example embodiments, may refer to a non-transitory computer-readable storage medium or a computer-readable storage device. In some examples, the memory 1204 is a temporary memory, meaning that a primary purpose of the memory 1204 may not be long-term storage. The memory 1204 may also refer to a volatile memory, meaning that the memory 1204 does not maintain stored contents when the memory 1204 is not receiving power. Examples of volatile memories include random access memories (RAM), dynamic random access memories (DRAM), static random access memories (SRAM), and other forms of volatile memories known in the art. In some examples, the memory 1204 is used to store program instructions for execution by the processor(s) 1202. The memory 1204, in one example, is used by software (e.g., the operating system 1214 or the software applications 1216). Generally, the software applications 1216 refer to software Applications suitable for implementing at least some operations of the methods for image and video transformation as described herein.

The mass storage devices 1206 may include one or more transitory or non-transitory computer-readable storage media and/or computer-readable storage devices. In some embodiments, the mass storage devices 1206 may be configured to store greater amounts of information than the memory 1204. The mass storage devices 1206 may further be configured for long-term storage of information. In some examples, the mass storage devices 1206 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 1208, in some examples, may be configured to receive input from a user through tactile, audio, video, or biometric channels. Examples of the input devices 1208 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 1200, or components thereof.

The output devices 1210, in some examples, may be configured to provide output to a user through visual or auditory channels. The output devices 1210 may include a video graphics adapter card, a liquid crystal display monitor, a light emitting diode (LED) monitor, an organic LED monitor, a sound card, a speaker, a lighting device, a LED, a projector, or any other device capable of generating output that may be intelligible to a user. The output devices 1210 may also include a touchscreen, a presence-sensitive display, or other input/output capable displays known in the art.

The network interface 1212 of the computer system 1200, in some example embodiments, can be utilized to communicate with external devices via one or more data networks such as one or more wired, wireless, or optical networks including, for example, the Internet, intranet, local area networks, wide area networks, cellular phone networks, Bluetooth radio, and an IEEE 902.11-based radio frequency network, Wi-Fi Networks®, among others. The network interface 1212 may be a network interface card, such as an Ethernet card, an optical transceiver, a radio frequency transceiver, or any other type of device that can send and receive information.

The operating system 1214 may control one or more functionalities of the computer system 1200 and/or components thereof. For example, the operating system 1214 may interact with the software applications 1216 and may facilitate one or more interactions between the software applications 1216 and components of the computer system 1200. As shown in FIG. 12, the operating system 1214 may interact with or be otherwise coupled to the software applications 1216 and components thereof. In some embodiments, the software applications 1216 may be included in the operating system 1214. In these and other examples, virtual modules, firmware, or software may be part of the software applications 1216.

Thus, systems and methods for text-driven photo style adjustment with generative AI have been described. Although embodiments have been described with reference to specific example embodiments, it will be evident that various modifications and changes can be made to these example embodiments without departing from the broader spirit and scope of the present Application. Accordingly, the specification and drawings are to be regarded in an illustrative rather than a restrictive sense.

What is claimed is:

1. A method comprising:
receiving an image including at least one object;
receiving a text including at least one instruction for transforming the image;
determining, based on the image, a foreground mask corresponding to the at least one object;
determining, based on the image, one or more face bounding boxes corresponding to one or more faces present in the image;
determining, based on the image, one or more body bounding boxes corresponding to one or more human bodies present in the image;
filtering, using the foreground mask, the one or more face bounding boxes to obtain at least one further face bounding box;
filtering, using the foreground mask, the one or more body bounding boxes to obtain at least one further human body bounding box;
analyzing the at least one further face bounding box and the at least one further human body bounding box to generate a text description concerning at least one person present in the image;
combining the text description and the text to obtain an updated text;
encoding the image into an image latent;
encoding the updated text into a text embedding;
randomly generating a first noise for a portion of the image latent;
adding the first noise to the image latent to obtain a noisy image latent;
providing the noisy image latent and the text embedding to a first neural network to generate a second noise;
removing the second noise from the noisy image latent to obtain a denoised image latent; and
decoding, using a second neural network, the denoised image latent into a result image.

2. The method of claim 1, further comprising, prior to decoding the denoised image latent, repeating the following steps until the denoised image latent converges into a further image latent:
providing the denoised image latent and the text embedding to the first neural network to update the second noise; and
removing the second noise from the denoised image latent.

3. The method of claim 1, further comprising, prior to encoding the updated text into the text embedding:
determining, based on the image, one or more animal bounding boxes corresponding to one or more animals present in the image;
filtering, using the foreground mask, the one or more animal bounding boxes to obtain at least one further animal bounding box;
analyze the at least one further animal bounding box to generate an animal description concerning the one or more animals present in the image; and
adding the animal description to the updated text.

4. The method of claim 1, wherein:
analyzing the at least one further face bounding box and the at least one further human body bounding box includes determining that the at least one further face bounding box matches the at least one further human body bounding box; and
in response to the determination, adding, to the text description, an indication that the image includes a human body with a face.

5. The method of claim 4, further comprising:
extracting, from the at least one further face bounding box and the at least one further human body bounding box, information concerning one or more of the following: an age of a person present in the image, a gender of the person present in the image, and ethnicity of the person present in the image; and
adding the information to the text description.

6. The method of claim 1, wherein:
analyzing the at least one further face bounding box and the at least one further human body bounding box includes determining that the at least one further human body bounding box mismatches the at least one further face bounding box; and
in response to the determination, adding, to the text description, an indication that the image includes a human body without a face.

7. The method of claim 6, further comprising:
extracting, from the at least one further human body bounding box, information concerning a pose associated with the human body; and
adding the information to the text description.

8. The method of claim 1, further comprising combining the at least one further face bounding box and the foreground mask to generate a segmentation mask, wherein the first noise and the second noise are generated solely for the portion of the image latent, the portion corresponding to a part of the image, the part being obtained by applying the segmentation mask to the image.

9. The method of claim 1, wherein the updated text is generated using a predefined template.

10. The method of claim 1, wherein the one or more body bounding boxes are determined using a pretrained neural network.

11. A computing device comprising:
a processor; and
a memory storing instructions that, when executed by the processor, configure the computing device to:
  receive an image including at least one object;
  receive a text including at least one instruction for transforming the image;
  determine, based on the image, a foreground mask corresponding to the at least one object;
  determine, based on the image, one or more face bounding boxes corresponding to one or more faces present in the image;
  determine, based on the image, one or more body bounding boxes corresponding to one or more human bodies present in the image;
  filter, using the foreground mask, the one or more face bounding boxes to obtain at least one further face bounding box;
  filter, using the foreground mask, the one or more body bounding boxes to obtain at least one further human body bounding box;
  analyze the at least one further face bounding box and the at least one further human body bounding box to generate a text description concerning at least one person present in the image;
  combine the text description and the text to obtain an updated text;
  encode the image into an image latent;
  encode the updated text into a text embedding;
  randomly generate a first noise for a portion of the image latent;
  add the first noise to the image latent to obtain a noisy image latent;
  provide the noisy image latent and the text embedding to a first neural network to generate a second noise;
  remove the second noise from the noisy image latent to obtain a denoised image latent; and
  decode, using a second neural network, the denoised image latent into a result image.

12. The computing device of claim 11, wherein the instructions further configure the computing device to, prior to decoding the denoised image latent, repeating the following steps until the denoised image latent converges into a further image latent:
  provide the denoised image latent and the text embedding to the first neural network to update the second noise; and
  remove the second noise from the denoised image latent.

13. The computing device of claim 11, wherein the instructions further configure the computing device to, prior to encoding the updated text into the text embedding:
  determine, based on the image, one or more animal bounding boxes corresponding to one or more animals present in the image;
  filter, using the foreground mask, the one or more animal bounding boxes to obtain at least one further animal bounding box;
  analyze the at least one further animal bounding box to generate an animal description concerning the one or more animals present in the image; and
  add the animal description to the updated text.

14. The computing device of claim 11, wherein:
analyzing the at least one further face bounding box and the at least one further human body bounding box includes determining that the at least one further face bounding box matches the at least one further human body bounding box; and
in response to the determination, adding, to the text description, an indication that the image includes a human body with a face.

15. The computing device of claim 14, wherein the instructions further configure the computing device to:
  extract, from the at least one further face bounding box and the at least one further human body bounding box, information concerning one or more of the following: an age of a person present in the image, a gender of the person present in the image, and ethnicity of the person present in the image; and
  add the information to the text description.

16. The computing device of claim 11, wherein:
analyzing the at least one further face bounding box and the at least one further human body bounding box includes determining that the at least one further human body bounding box mismatches the at least one further face bounding box; and
in response to the determination, adding, to the text description, an indication that the image includes a human body without a face.

17. The computing device of claim 16, wherein the instructions further configure the computing device to:
  extract, from the at least one further human body bounding box, information concerning a pose associated with the human body; and
  add the information to the text description.

18. The computing device of claim 11, wherein the instructions further configure the computing device to combine the at least one further face bounding box and the foreground mask to generate a segmentation mask, wherein the first noise and the second noise are generated solely for the portion of the image latent, the portion corresponding to a part of the image, the part being obtained by applying the segmentation mask to the image.

19. The computing device of claim 11, wherein the updated text is generated using a predefined template.

20. A non-transitory computer-readable storage medium, the computer-readable storage medium including instructions that, when executed by a computing device, cause the computing device to:
  receive an image including at least one object;
  receive a text including at least one instruction for transforming the image;
  determine, based on the image, a foreground mask corresponding to the at least one object;
  determine, based on the image, one or more face bounding boxes corresponding to one or more faces present in the image;
  determine, based on the image, one or more body bounding boxes corresponding to one or more human bodies present in the image;
  filter, using the foreground mask, the one or more face bounding boxes to obtain at least one further face bounding box;

filter, using the foreground mask, the one or more body bounding boxes to obtain at least one further human body bounding box;

analyze the at least one further face bounding box and the at least one further human body bounding box to generate a text description concerning at least one person present in the image;

combine the text description and the text to obtain an updated text;

encode the image into an image latent;

encode the updated text into a text embedding;

randomly generate a first noise for a portion of the image latent;

add the first noise to the image latent to obtain a noisy image latent;

provide the noisy image latent and the text embedding to a first neural network to generate a second noise;

remove the second noise from the noisy image latent to obtain a denoised image latent; and decode, using a second neural network, the denoised image latent into a result image.

\* \* \* \* \*